(12) United States Patent
Suzuki et al.

(10) Patent No.: US 12,162,543 B2
(45) Date of Patent: Dec. 10, 2024

(54) STEERING CONTROL DEVICE

(71) Applicant: DENSO CORPORATION, Kariya (JP)

(72) Inventors: Takashi Suzuki, Kariya (JP); Hideki Kabune, Kariya (JP); Toshihiro Fujita, Kariya (JP); Kunihiko Matsuda, Kariya (JP); Haruki Amano, Kariya (JP)

(73) Assignee: DENSO CORPORATION, Kariya (JP)

( * ) Notice: Subject to any disclaimer, the term of this patent is extended or adjusted under 35 U.S.C. 154(b) by 206 days.

(21) Appl. No.: 18/053,695

(22) Filed: Nov. 8, 2022

(65) Prior Publication Data

US 2023/0079227 A1    Mar. 16, 2023

Related U.S. Application Data

(63) Continuation of application No. PCT/JP2021/017550, filed on May 7, 2021.

(30) Foreign Application Priority Data

May 12, 2020  (JP) ................................. 2020-083885

(51) Int. Cl.
  *B62D 5/04*    (2006.01)
(52) U.S. Cl.
  CPC .................. *B62D 5/0457* (2013.01)
(58) Field of Classification Search
  CPC .... B62D 1/181; B62D 5/0406; B62D 5/0457; B62D 5/0481
  See application file for complete search history.

(56) References Cited

U.S. PATENT DOCUMENTS

| | | | |
|---|---|---|---|
| 6,914,347 B2 * | 7/2005 | Geber | B60R 25/02142 |
| | | | 307/10.6 |
| 6,959,969 B2 | 11/2005 | Simpson et al. | |
| 11,750,120 B2 * | 9/2023 | Suzuki | H02P 25/22 |
| | | | 318/8 |
| 11,811,338 B2 * | 11/2023 | Suzuki | H02P 27/06 |
| 2003/0155875 A1 | 8/2003 | Weinmann | |

(Continued)

FOREIGN PATENT DOCUMENTS

| | | |
|---|---|---|
| JP | 5125055 B2 | 1/2013 |
| JP | 5614576 B2 | 10/2014 |

(Continued)

*Primary Examiner* — Carl C Staubach
(74) *Attorney, Agent, or Firm* — MASCHOFF BRENNAN

(57) ABSTRACT

A first circuit energizes a steering assist actuator to electrically assist steering of a driver. A second circuit is provided in a same housing as the first circuit and energizes a positional actuator to move a steering position. A controller operates the first and second circuits to control operations of the steering assist actuator and the positional actuator. The controller changes a priority between the first circuit and the second circuit in a start period, in which the steering control device is started, a normal operation period, in which the steering control device is operated normally, and a stop period, in which the steering control device is stopped. The priority includes at least one of an order of operating the first circuit and the second circuit, output allocation between the first circuit and the second circuit, and output magnitude between the first circuit and the second circuit.

8 Claims, 17 Drawing Sheets

(56) References Cited

U.S. PATENT DOCUMENTS

| | | | |
|---|---|---|---|
| 2007/0169987 A1* | 7/2007 | Fujiyama | B62D 5/0484 |
| | | | 701/41 |
| 2011/0190986 A1* | 8/2011 | Bitou | B62D 5/064 |
| | | | 701/41 |
| 2015/0094927 A1* | 4/2015 | Takahashi | B60W 30/143 |
| | | | 701/93 |
| 2017/0129534 A1* | 5/2017 | Sone | B62D 5/0463 |
| 2020/0070833 A1* | 3/2020 | Suzuki | B62D 11/24 |
| 2020/0269908 A1* | 8/2020 | Sekiya | B62D 15/021 |
| 2022/0048558 A1* | 2/2022 | Christian, Jr. | B62D 15/0245 |
| 2022/0063591 A1* | 3/2022 | Inoue | B60W 50/0205 |

FOREIGN PATENT DOCUMENTS

| | | |
|---|---|---|
| JP | 5614588 B2 | 10/2014 |
| JP | 2014-218129 A | 11/2014 |
| JP | 5768999 B2 | 8/2015 |

\* cited by examiner

TILT ACTUATOR

TELESCOPIC ACTUATOR

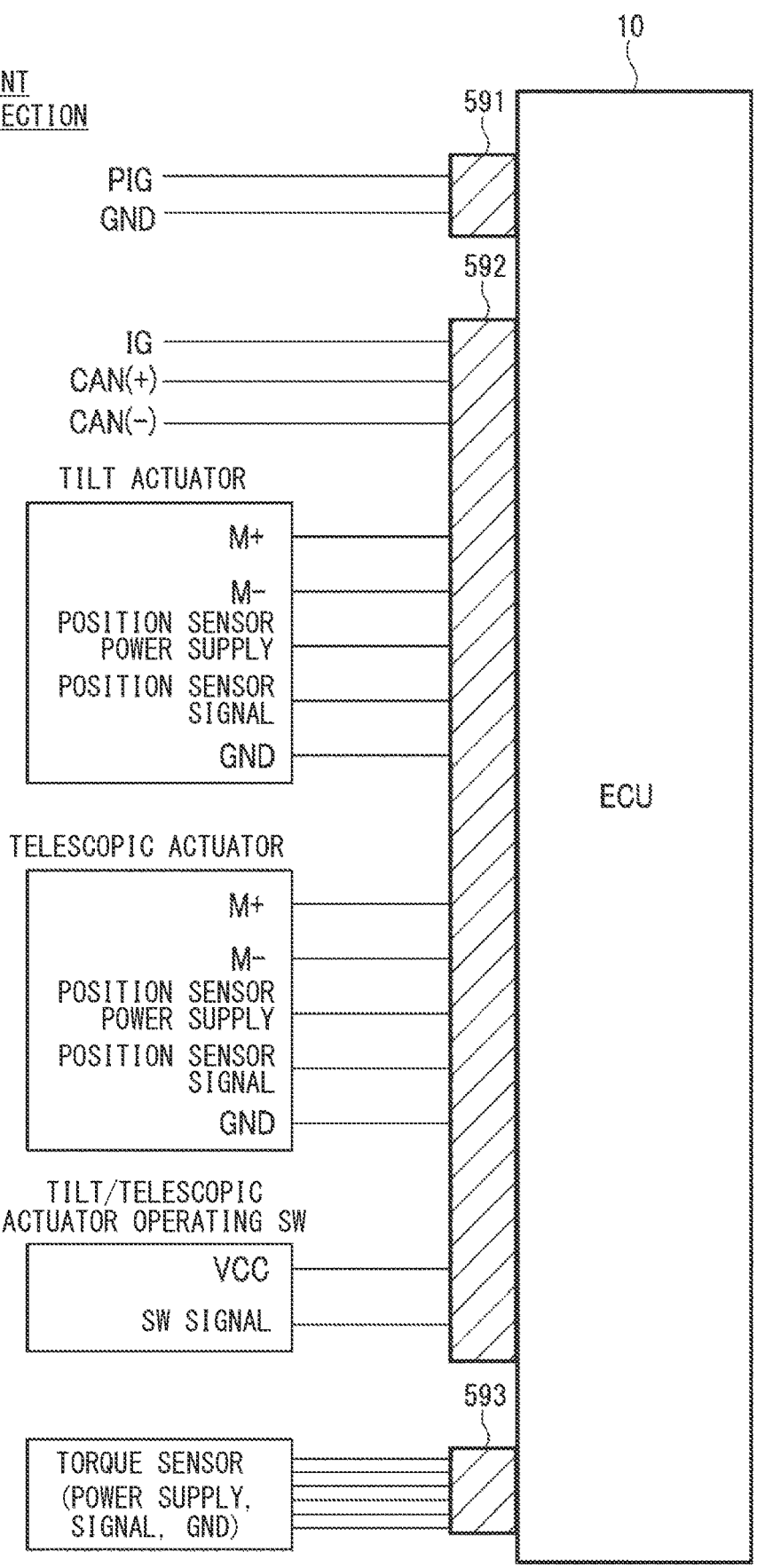

CIRCUIT CONFIGURATION EXAMPLE 1

LATCH CIRCUIT CONFIGURATION EXAMPLE 1

LATCH CIRCUIT CONFIGURATION EXAMPLE 2 ical Field

STEERING CONTROL DEVICE

CROSS REFERENCE TO RELATED APPLICATION

The present application is a continuation application of International Patent Application No. PCT/JP2021/017550 filed on May 7, 2021, which designated the U.S. and claims the benefit of priority from Japanese Patent Application No. 2020-083885 filed on May 12, 2020. The entire disclosures of all of the above applications are incorporated herein by reference.

TECHNICAL FIELD

The present disclosure relates to a steering control device.

BACKGROUND

Conventionally, a steering control device has been employed for assisting steering of a vehicle.

SUMMARY

According to an aspect of the present disclosure, a steering control device comprises a first circuit and a second circuit provided accommodated in a same housing and a controller. The first circuit is configured to energize a steering assist actuator that is configured to electrically assist steering of a driver. The second circuit is configured to energize at least one positional actuator to move a steering position. The controller is configured to operate the first circuit and the second circuit to control operations of the steering assist actuator and the positional actuator.

BRIEF DESCRIPTION OF THE DRAWINGS

The above and other objects, features and advantages of the present disclosure will become more apparent from the following detailed description made with reference to the accompanying drawings. In the drawings:

FIG. 5 is a diagram illustrating connector connections according to a first embodiment;

DETAILED DESCRIPTION

Figure 1:
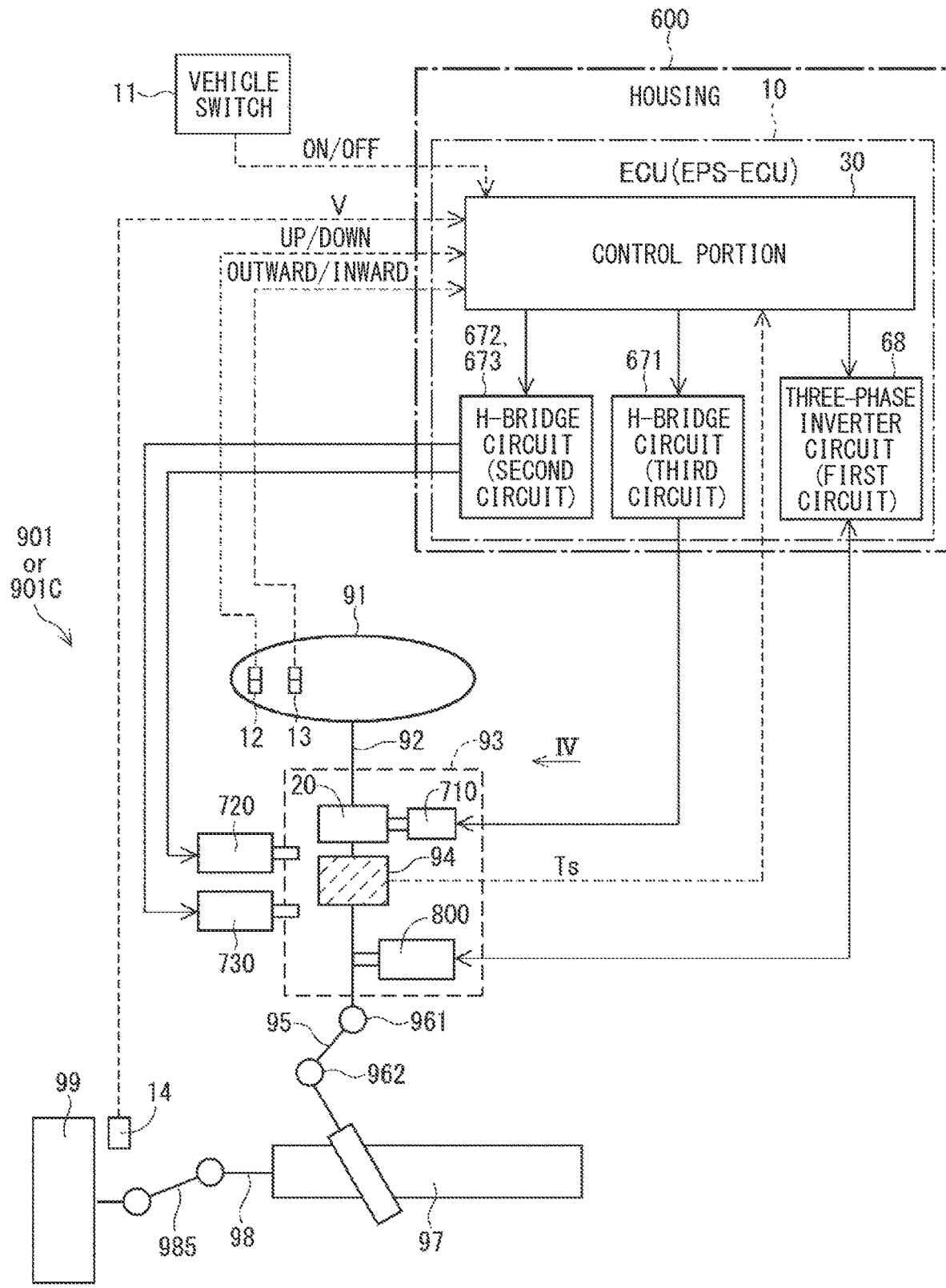
FIG. 1 is a diagram illustrating a column-type EPS system to which the ECU (steering control device) according to embodiments is applied.

Hereinafter, examples of the present disclosure will be described.

According to an example of the present disclosure, a steering control device shares a circuit to drive a multiphase rotary machine and a direct-current rotary machine related to the steering of a vehicle. The motor control device uses a single three-phase inverter drive circuit to drive a three-phase motor for electric power steering (EPS) and a direct-current motor for tilt and telescopic operations. The configuration enables to integrate power inverters by sharing the power inverter for the three-phase motor and the direct-current motor.

The present disclosure uses the term "actuator" including other than motors to represent a superordinate concept for motors. The heat or power associated with circuit operations centers on a configuration in which the same housing includes circuits to drive multiple actuators. Therefore, the configuration may require increase in the thermal mass and the radiation amount for circuits. Therefore, an issue arises that the size of noise reduction elements and terminals such as coils and capacitors may increase, and consequently, the size of the housing may increase.

According to an example of the present disclosure, a steering control device comprises a first circuit configured to energize a steering assist actuator that is configured to electrically assist steering of a driver. The steering control device further comprises at least one second circuit provided in a same housing as the first circuit and configured to energize at least one positional actuator to move a steering position. The steering control device further comprises a controller configured to operate the first circuit and the second circuit to control operations of the steering assist actuator and the positional actuator. The controller is configured to change a priority between the first circuit and the second circuit in a start period, in which the steering control device is started, in a normal operation period, in which the steering control device is operated normally, and in a stop period, in which the steering control device is stopped. The priority includes at least one of an order of operating the first circuit and the second circuit, output allocation between the first circuit and the second circuit, and an output magnitude between the first circuit and the second circuit.

The steering control device according to the present embodiment includes circuits to drive multiple actuators in the same housing. A control portion (controller) efficiently drives multiple actuators by operating first and second circuits in accordance with the order of operations or priorities of output distribution or magnitude. It is possible to avoid the concentration of heat and power and suppress the thermal mass and radiation amount of the circuits. The housing can be downsized.

For example, the control portion changes priorities according to steering positions during a start period. Specifically, a tilt telescopic operation to move steering positions is prioritized when the steering position is out of the driver's reach during the start period. A steering wheel moved to a memory position enables the driver to control the steering.

The description below explains embodiments of the steering control device according to the present disclosure by reference to the drawings. The steering control device according to the embodiments is applied to an electric power steering system (EPS system) or a steer-by-wire system (SBW system) of vehicles, and functions as an EPS-ECU or an SBW-ECU. The EPS-ECU and the SBW-ECU are collectively denoted as "ECU" in the following embodiments.

The steering control device according to the first embodiment includes a first circuit and a second circuit. The first circuit energizes a three-phase motor as a steering assist actuator. The second circuit energizes two direct-current motors as a tilt actuator and a telescopic actuator. The steering control device according to the second embodiment further includes a third circuit that energizes the direct-current motor as a lock actuator. Hereinafter, the tilt actuator and the telescopic actuator are collectively denoted as "positional actuators" and are treated as the same type of actuators.

The first embodiment includes the first and second circuits that energize two types of actuators such as steering assist and positional actuators. The second embodiment includes the first, second, and third circuits that energize three types of actuators such as steering assist, positional, and lock actuators. The configuration of the second embodiment includes the configuration of the first embodiment. Regarding the order of explanation of the present specification, the first embodiment and the second embodiment are described in parallel, not sequentially from the explanation of the first embodiment and then to the explanation of the second embodiment. Depending on the contents, the second embodiment will be mainly explained. The description of the first embodiment is comparable to the description of the second embodiment by eliminating the explanation about the lock actuator. The first embodiment and the second embodiment are collectively referred to as "the present embodiment."

(System Configuration)

Figure 2:
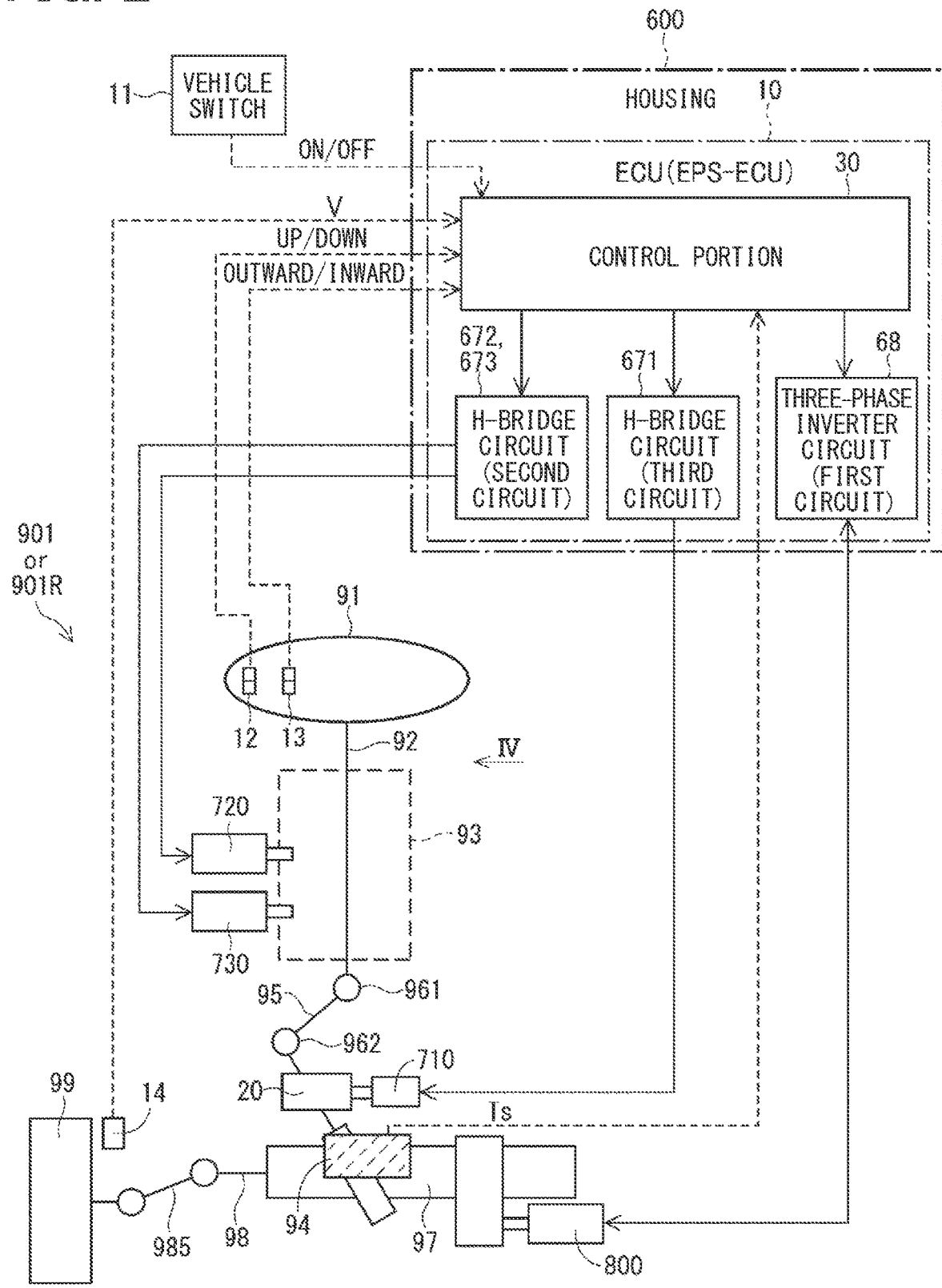
FIG. 2 is a diagram illustrating a rack-type EPS system to which the ECU (steering control device) according to embodiments is applied.
Figure 3:
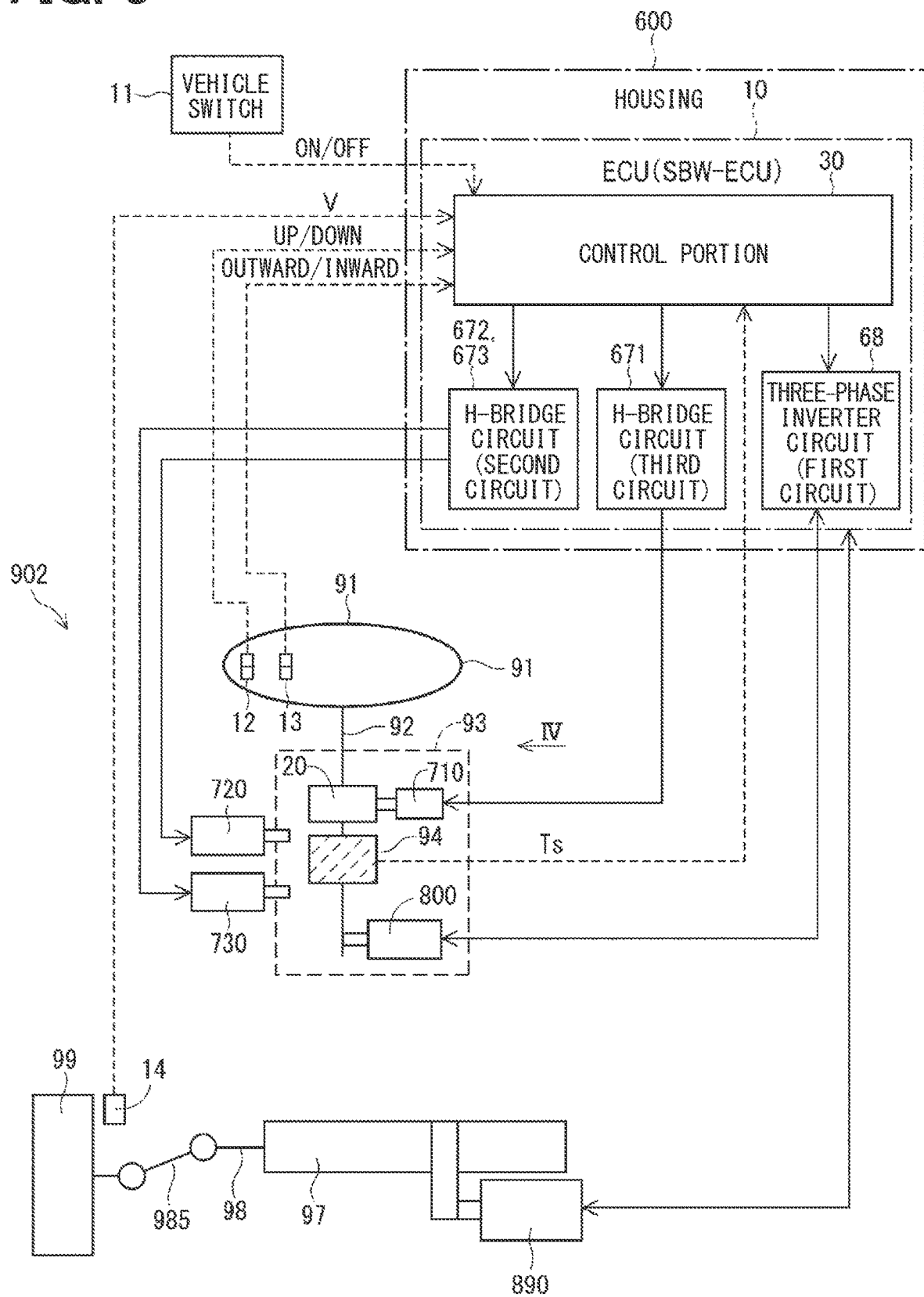
FIG. 3 is a diagram illustrating an SBW system to which the ECU (steering control device) according to embodiments is applied.

By reference to FIGS. 1 through 4B, the description below explains a "system configuration including three types of actuators" to which the ECU as the "steering control device" according to the second embodiment is applied. FIGS. 1 and 2 illustrate an EPS system 901 that mechanically connects a steering mechanism and a turning mechanism. FIG. 1 illustrates the column-type EPS system 901. FIG. 2 illustrates the rack-type EPS system 901. For the purpose of distinction, the column-type EPS system is denoted as 901C, and the rack-type EPS system is denoted as 901R. FIG. 3 illustrates an SBW system 902 that mechanically separates the steering mechanism and the turning mechanism. FIGS. 1 to 3 illustrate only one side of a tire 99 and omit the opposite side.

As illustrated in FIGS. 1 and 2, the EPS system 901 includes a "steering" system composed of a steering wheel 91, a steering shaft 92, an intermediate shaft 95, and a rack 97, for example. The steering shaft 92 is included in the steering column 93. The steering wheel 92 is connected to the steering wheel 91 at one end and is connected to the intermediate shaft 95 at the other end.

The steering rack 97 is provided at the end of the intermediate shaft 95 opposite the steering wheel 91. The steering rack 97 uses a rack and pinion mechanism to convert the rotation into the reciprocating movement and transmit it. The steering rack 97, when reciprocated, turns the tire 99 via a tie rod 98 and a knuckle arm 985. Universal joints 961 and 962 are provided in the middle of the intermediate shaft 95. The universal joints 961 and 962 absorb the displacement caused by the tilt operation and the telescopic operation of the steering column 93.

According to the column-type EPS system 901C illustrated in FIG. 1, the steering column 93 includes a locking device 20 and a steering assist actuator 800 composed of a three-phase motor as a "multiphase rotary machine." The output torque from the steering assist actuator 800 is transmitted to the steering shaft 92. The torque sensor 94 is provided in the middle of the steering shaft 92 and detects the driver's steering torque Ts based on the torsional displacement of a torsion bar.

According to the rack-type EPS system 901R illustrated in FIG. 2, a steering rack 97 includes the locking device 20 and the steering assist actuator 800 composed of a three-phase motor as a "multiphase rotary machine." The output torque from the steering assist actuator 800 assists the reciprocating movement of the steering rack 97. The torque sensor 94 detects the driver's steering torque Ts transmitted to the steering rack 97.

The ECU 10 is activated by an ON/OFF signal from a vehicle switch 11, for example. The vehicle switch 11 is, for example, an ignition switch or a push switch used for engine vehicles, hybrid vehicles, or electric vehicles. Each signal supplied to the ECU 10 is communicated via CAN or serial communication, for example, or is transmitted as an analog voltage signal. In the EPS system 901, the ECU 10 controls the driving of the steering assist actuator 800 based on steering torque Ts detected by the torque sensor 94 or vehicle speed V detected by a vehicle speed sensor 14. The steering assist actuator 800 electrically assists the driver's steering.

A tilt actuator 720, a telescopic actuator 730, and a lock actuator 710 are composed of direct-current motors as "direct-current rotary machines." According to the second embodiment, a common control portion 30 drives the steering assist actuator 800 and two types of three direct-current motors. According to the first embodiment, the common control portion 30 drives the steering assist actuator 800 and one type of two direct-current motors such as the tilt actuator 720 and the telescopic actuator 730. The first embodiment may or may not include the lock actuator 710 or may include a mechanism driven by another independent device.

The tilt actuator 720 and telescopic actuator 730 are provided for the steering column 93. The tilt actuator 720 and the telescopic actuator 730 are both "steering positional actuators" that move steering positions. In the present specification, the "steering positional actuator" is shortened to a "positional actuator."

Figure 4A:
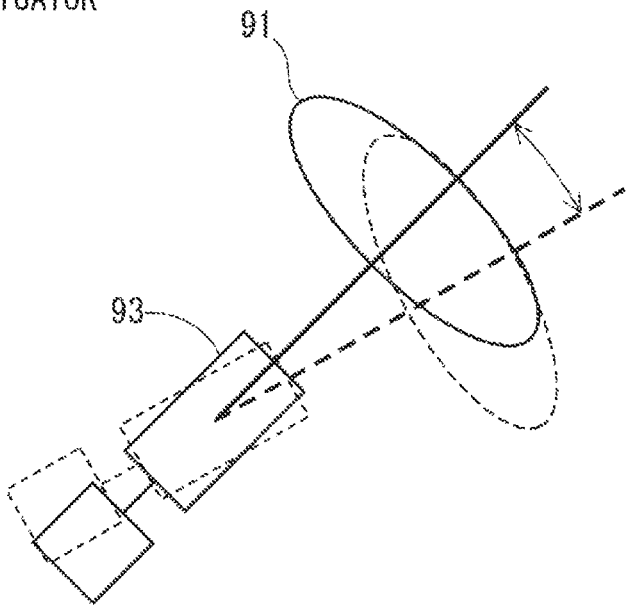
FIG. 4A is a schematic diagram illustrating a tilt operation.

The driver operates a tilt switch 12 to supply an "up/down" instruction to the ECU 10. Then, ECU 10 instructs the tilt actuator 720 to tilt. As illustrated in FIG. 4A, the tilt actuator 720 adjusts the tilt angle and moves the steering wheel 91 up and down. When the vehicle switch 11 is turned on to start the vehicle, the steering wheel 91 moves to a predetermined driving position. When the vehicle switch 11 is turned off to stop the vehicle, the steering wheel 91 moves to a side that provides the driver with a wide space.

Figure 4B:
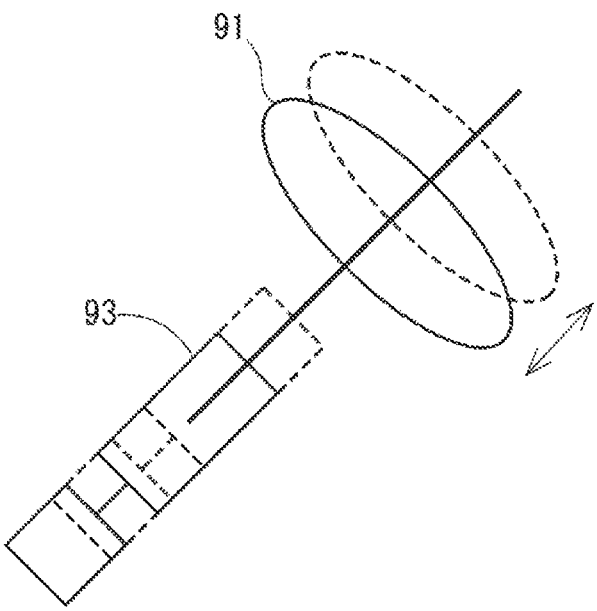
FIG. 4B is a schematic diagram illustrating a telescopic operation.

The driver operates a telescopic switch 13 to supply an "outward/inward" instruction to the ECU 10. Then, the ECU 10 instructs the telescopic actuator 730 to operate telescopically. As illustrated in FIG. 4B, the telescopic actuator 730 adjusts the telescopic length and moves the steering wheel 91 back and forth. When the vehicle switch 11 is turned on to start the vehicle, the steering wheel 91 moves to a predetermined driving position. When the vehicle switch 11 is turned off to stop the vehicle, the steering wheel 91 moves to a side that provides the driver with a wide space.

In the present specification, the "steering lock actuator" is shortened to a "lock actuator." The lock actuator 710 drives the locking device 20 to mechanically regulate steering rotation and thereby lock the steering wheel 91 so that it does not rotate during parking, for example. The ECU 10 forces the lock actuator 710 to release or reactivate the steering lock based on the ON/OFF signal from the vehicle switch 11.

FIG. 3 illustrates the SBW system 902 that mechanically separates the steering mechanism and the turning mechanism. Unlike the EPS system 901, the SBW system 902 excludes the intermediate shaft 95. Driver input information is electrically transmitted to the turning actuator 890 via the ECU 10. The driver input information includes the driver's steering torque Ts or angles of steering wheel 91, for example. The rotation of the turning actuator 890 is converted into the reciprocating movement of the steering rack 97 to turn the tire 99 via the tie rod 98 and the knuckle arm 985. Though not shown in FIG. 3, there is a turning actuator ECU that drives the turning actuator 890 in response to the driver's operation on the steering wheel.

According to the SBW system 902, the driver cannot directly sense the reaction against steering. To solve this problem, the ECU 10 gives the driver an appropriate steering feel by controlling the drive of a reaction actuator 800 and rotating the steering wheel 91 to apply a reaction to the steering.

In the present specification, the application of reaction according to the SBW system 902 is interpreted as the same concept as the steering assist according to the EPS system 901 in a broad sense. The "reaction actuator" is assumed to be included in the "steering assist actuator that electrically assists the driver's steering."

The SBW system 902 in FIG. 3 allows the positional actuators 720 and 730 and the lock actuator 710 to be used in the same manner as the column-type EPS system 901C in FIG. 1. There is no difference between the EPS system 901 and the SBW system 902 in the following explanation of the steering assist actuator 800, the positional actuators 720 and 730, and the lock actuator 710 concerning the ECU 10.

The ECU 10 according to the first embodiment includes a "first circuit" 68, "second circuits" 672 and 673, and the control portion 30, for example. The three-phase inverter circuit 68 as the "first circuit" energizes the steering assist actuator 800. The H-bridge circuits 672 and 673 as the "second circuit" energize two positional actuators, namely, the tilt actuator 720 and the telescopic actuator 730. The three-phase inverter circuit 68 and the H-bridge circuits 672 and 673 provide motor drive circuits. The control portion 30 operates the three-phase inverter circuit 68 and the H-bridge circuits 672 and 673 and controls operations of the steering assist actuator 800 and the positional actuators 720 and 730.

The ECU 10 according to the second embodiment further includes a "third circuit" 671. The H-bridge circuit 671 as the "third circuit" energizes the lock actuator 710. The three-phase inverter circuit 68 and the H-bridge circuits 672, 673, and 671 provide motor drive circuits. The control portion 30 operates the three-phase inverter circuit 68 and the H-bridge circuits 672, 673, and 671 and controls operations of the steering assist actuator 800, the positional actuators 720 and 730, and the lock actuator 710.

The control portion 30 is composed of a microcomputer and a drive circuit, for example, and includes, though not shown, a CPU, ROM, RAM, I/O, and a bus line connecting these configurations. The control portion 30 provides control based on software processing by allowing the CPU to execute a program previously stored in a physical memory device (readable non-transitional tangible recording medium) such as ROM. The control portion 30 also provides control based on hardware processing through the use of a dedicated electronic circuit. The same microcomputer operates the "first circuit" 68 and the "second circuits" 672 and 673 and eliminates the need to consider communication delays or communication abnormalities between microcomputers during the mediation of priorities, thus facilitating operations compared to a case where multiple microcomputers are used.

The same housing 600 includes the three-phase inverter circuit 68 and the H-bridge circuits 672 and 673 according to the first embodiment or the three-phase inverter circuit 68 and the H-bridge circuits 672, 673, and 671 according to the second embodiment. According to the examples of FIGS. 1 to 3, the same housing 600 includes the control portion 30 along with these motor drive circuits. It is possible to integrate the ECU 10 and reduce wiring parts such as harnesses and connectors. As will be described later, circuit configuration examples 1 and 3 (see FIGS. 7 and 9) may use one or two harnesses or connectors, for example, to be electrically connected with positive and negative electrodes of power supply Bt.

However, the heat or power associated with circuit operations centers on the configuration in which the same housing includes circuits to drive multiple actuators. It is necessary to increase the thermal mass and the radiation amount for circuits. There is an issue of increasing the size of noise reduction elements and terminals such as coils and capacitors and consequently the size of the housing. The present embodiment downsizes the housing of the steering control device that allows the same housing to include circuits to drive multiple actuators. The means to solve the problems will be described later.

The device connections will be described by reference to FIGS. 5 and 6. The steering assist actuator 800 according to the present embodiment is configured as a "mechatronically integrated" brushless three-phase motor in which the ECU 10 is integrated at one end in the axial direction. The direct-current motors, functioning as the positional actuators 720 and 730 and the lock actuator 710, are connected to the ECU 10 via connectors. The connection between the ECU 10 and the steering assist actuator 800 is mandatory. Meanwhile, the connection between the ECU 10 and the direct-current motor 720, 730, or 710 is optional. For example, a circuit board including the ECU 10 may be shared. Connector specifications and related electronic components may be added later as options.

FIG. 5 illustrates a connector connection in the system according to the first embodiment that provides the tilt actuator 720 and the telescopic actuator 730 as direct-current motors. This connection separately provides a power connector 591, a signal connector 592, and a torque sensor connector 593. The power connector 591 connects with a power line (PIG) and a ground line from a direct current power supply. The signal connector 592 connects with a control power line (IG) and a CAN communication line as well as wiring for the tilt actuator 720 and the telescopic actuator 730. The torque sensor connector 593 connects with the whole of a power line, a signal line, and a ground line of the torque sensor 94.

The tilt actuator 720 and the telescopic actuator 730 connect with motor lines (M+, M−), a position sensor power line, a position sensor signal line, and a ground line. It is possible to eliminate the position sensor and therefore the position sensor power line and the position sensor signal line. To do this, the torque or the current and the time may be used to determine that a predetermined position is reached. Alternatively, a predetermined current or voltage may be applied according to the on/off operation of the tilt switch 12 and the telescopic switch 13. The connection in FIG. 5 may receive signals from the tilt switch 12 and the telescopic switch 13 via CAN communication or serial communication, and receive analog voltage signals.

The motor lines (M+, M−) of the positional actuators 720 and 730, though related to the power supply, require a motor current smaller than that of the steering assist actuator 800, and can be connected to the signal connector 592. When requiring large currents, the positional actuators 720 and 730 may use another connector or may share the power connector 591 for the power line (PIG) and the ground line from the direct current power supply. The positional actuators 720 and 730 may use respective connectors.

Figure 6:
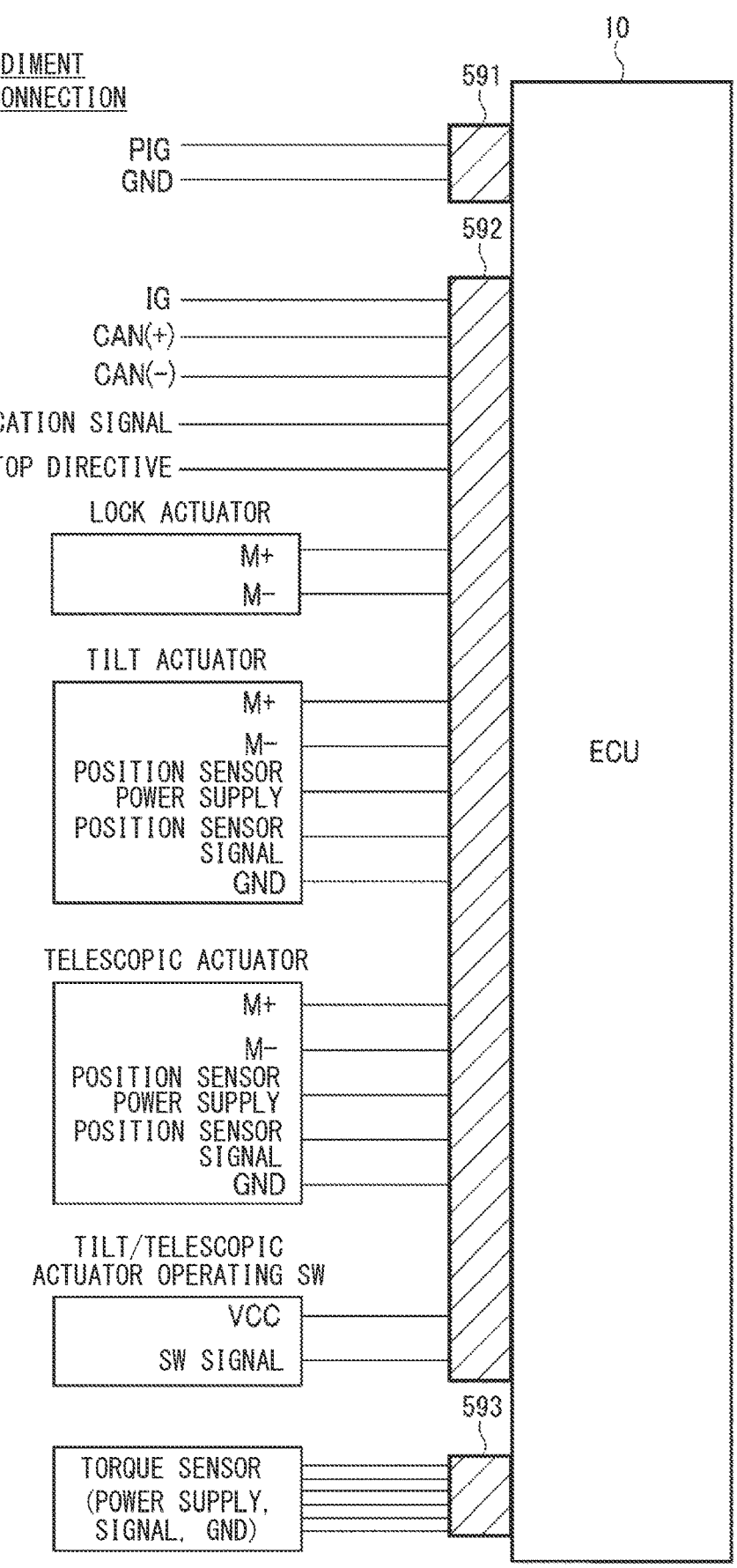
FIG. 6 is a diagram illustrating connector connections according to a second embodiment.

FIG. 6 illustrates a connector connection in the system according to the second embodiment that further provides the lock actuator 710 as a direct-current motor. In comparison to the configuration in FIG. 5, an authentication signal, a stop directive signal line, and motor lines (M, M−) of the lock actuator 710 are added to the signal connector 592. The signals for the lock actuator 710 may also use respective connectors similarly to the positional actuators 720 and 730.

(Configuration Example of the Motor Drive Circuit)

By reference to FIGS. 7 to 10, the description below explains three circuit configuration examples of the motor drive circuit according to the first embodiment. Illustrations are omitted from the second embodiment because only one similar H-bridge circuit 671 is added in parallel with the H-bridge circuits 672 and 673. The three-phase inverter circuit 68 drives the steering assist actuator 800 that is represented as a "scheme," namely, a unit including a three-phase winding set and a three-phase inverter circuit corresponding to the winding set. Circuit configuration examples 1 and 2 illustrated in FIGS. 7 and 8 each correspond to a single-scheme configuration. Circuit configuration example 3 illustrated in FIG. 9 corresponds to a dual-scheme configuration. As illustrated in FIG. 10, the dual-scheme configuration allows the "first circuit" 68 to be composed of two three-phase inverter circuits 681 and 682.

According to the single-scheme configuration, the three-phase winding set includes U-phase, V-phase, and W-phase windings 811, 812, and 813 connected to neutral point N. Voltage is applied to the windings 811, 812, and 813 corresponding to the phases from the three-phase inverter circuit 68. Each phase generates a reverse voltage proportional to the product of a rotation speed and a sin value of the phase. For example, reverse voltages generated in each phase are expressed by equations (1.1) through (1.3) based on voltage amplitude A, rotation speed ω, and phase θ.

$$Eu = -A\omega \sin\theta \quad (1.1)$$

$$Ev = -A\omega \sin(\theta-120) \quad (1.2)$$

$$Ew = -A\omega \sin(\theta+120) \quad (1.3)$$

The steering assist actuator 800 according to the dual-scheme configuration includes two three-phase winding sets 801 and 802. The three-phase winding set 801 in the first scheme includes U1-phase, V1-phase, and W1-phase windings 811, 812, and 813 connected at neutral point N1. The three-phase inverter circuit 681 in the first scheme applies voltage to the windings 811, 812, and 813 corresponding to the phases of the three-phase winding set 801 in the first scheme.

The three-phase winding set 802 in the second scheme includes U2-phase, V2-phase, and W2-phase windings 821, 822, and 823 connected to neutral point N2. The three-phase inverter circuit 682 in the second scheme applies voltage to the windings 821, 822, and 823 corresponding to the phases of the three-phase winding set 802 in the second scheme.

As illustrated in FIG. 10, the steering assist actuator 800 in the dual-scheme configuration provides a double-winding rotary machine concentrically provided with two three-phase winding sets 801 and 802. The two three-phase winding sets 801 and 802 have the same electrical characteristics and are placed on a common stator at an electrical angle of 30 degrees displaced from each other. In this case, reverse voltages generated in each phase of the first scheme and the second scheme are expressed by equations (2.1) through (2.3) and (2.4a) through (2.6a) based on voltage amplitude A, rotation speed ω, and phase θ.

$$Eu1 = -A\omega \sin\theta \quad (2.1)$$

$$Ev1 = -A\omega \sin(\theta-120) \quad (2.2)$$

$$Ew1 = -A\omega \sin(\theta+120) \quad (2.3)$$

$$Eu2 = -A\omega \sin(\theta+30) \quad (2.4a)$$

$$Ev2 = -A\omega \sin(\theta-90) \quad (2.5a)$$

$$Ew2 = -A\omega \sin(\theta+150) \quad (2.6a)$$

When the phase relationship between the two systems is reversed, phase (θ+30) of the U2 phase changes to (θ−30), for example. In this case, reverse voltages generated in the second-scheme phases are expressed by equations (2.4b) through (2.6b) instead of equations (2.4a) through (2.6a). A phase difference equivalent to 30 degrees is generally expressed as (30±60×k) degrees, where k is an integer. Alternatively, the second scheme may be positioned in the same phase as the first scheme.

$$Eu2 = -A\omega \sin(\theta-30) \quad (2.4b)$$

$$Ev2 = -A\omega \sin(\theta+90) \quad (2.5b)$$

$$Ew2 = -A\omega \sin(\theta-150) \quad (2.6b)$$

The H-bridge circuits 672 and 673 drive the positional actuators 720 and 730 composed of windings 724 and 734. When the tilt actuator 720 is energized, reverse voltage E2 is generated in proportion to rotation speed ω2. Suppose the proportionality constant is denoted as EA2. Then, reverse voltage E2 is expressed by the equation "E2=−EA2ω2." A direct current applied to the tilt actuator 720 is denoted as I2. When the telescopic actuator 730 is energized, reverse voltage E3 is generated in proportion to the rotation speed ω3. Suppose the proportionality constant is denoted as EA3. Then, reverse voltage E3 is expressed by the equation "E3=−EA3ω3." A direct current applied to the telescopic actuator 730 is denoted as I3.

The description below explains circuit configuration examples 1 to 3 in order. In the ECU 101 according to circuit configuration example 1 illustrated in FIG. 7, common power supply Bt is parallel provided with the three-phase inverter circuit 68 and the two H-bridge circuits 672 and 673 independently of each other. The three-phase inverter circuit 68 and the H-bridge circuits 672 and 673 are connected to the positive electrode of power supply Bt via high-potential line Lp and to the negative electrode of power supply Bt via low-potential line Lg. Power supply Bt is provided as a battery whose reference voltage is 12 V, for example. A direct-current voltage supplied from power supply Bt to the three-phase inverter circuit 68 is denoted as "input voltage Vri." A direct-current voltage supplied to the H-bridge circuits 672 and 673 is denoted as "input voltage Vrd."

The three-phase inverter circuit 68 converts the direct-current power of power supply Bt into three-phase alternating-current power and energizes the steering assist actuator 800 based on operations of inverter switching elements IUH, IUL, IVH, IVL, IWH, and IWL bridge-connected at the high potential side and the low potential side. Capacitor Ci is provided between high-potential line Lp and low-potential line Lg at the side of the three-phase inverter circuit 68 toward power supply Bt.

Specifically, inverter switching elements IUH, IVH, and IWH are upper arm elements provided on the high potential side of the U, V, and W phases, respectively. Inverter switching elements IUL, IVL, and IWL are lower arm elements provided on the low potential side of the U, V, and W phases, respectively. The upper arm elements and lower arm elements in the same phase are hereinafter collectively denoted as "IUH/L, IVH/L, and IWH/L." A set of serially connected switching elements on the high-potential and low-potential sides is defined as a "leg." The reference symbol "IUH/L" represents a U-phase leg.

Current sensors SAU, SAV, and SAW detect phase currents Iu, Iv, and Iw flowing through the phases and are placed between low-potential line Lg and lower arm elements IUL, IVL, and IWL corresponding to the phases of the three-phase inverter circuit 68. Current sensors SAU, SAV, and SAW are composed of shunt resistance, for example.

On the current path between power supply Bt and capacitor Ci, power supply relay Pir is serially connected to the side of power supply Bt, and reverse connection protection relay PiR is serially connected to the side of capacitor Ci. Power supply relay Pir and reverse connection protection relay PiR are composed of semiconductor switching elements such as MOSFETs or mechanical relays. Power supply relay Pir and reverse connection protection relay PiR, when turned off, can cut electricity from power supply Bt to the three-phase inverter circuit 68. Power relay Pir shuts off the current flowing in the direction valid when the electrodes of power Bt are connected in the normal direction. Reverse connection protection relay PiR shuts off the current flowing in the direction valid when the electrodes of power Bt are connected in the direction opposite to the normal direction.

The H-bridge circuits 672 and 673 each contain two legs composed of four switching elements. One leg of the H-bridge circuit 672 includes a high-potential switching element 2Ha and a low-potential switching element 2La. The other leg includes a high-potential switching element 2Hb and a low-potential switching element 2Lb. A tilt actuator 720 is connected between the midpoints of each leg. One leg of the H-bridge circuit 673 includes a high-potential switching element 3Ha and a low-potential switching element 3La. The other leg includes a high-potential switching element 3Hb and a low-potential switching element 3Lb. A telescopic actuator 730 is connected between the midpoints of each leg.

In terms of the tilt actuator 720, for example, current I2 flows in the positive direction when the switching elements 2Ha and 2Lb are turned on. Current I2 flows in the negative direction when the switching elements 2Hb and 2La are turned on. The tilt actuator 720 normally rotates when energized in the positive direction and reversely rotates when energized in the negative direction to provide the "up/down" tilt operation. Similarly, the telescopic actuator 730 normally rotates when energized in the positive direction and reversely rotates when energized in the negative direction to provide the "outward/inward" telescopic operation.

Current sensors SA2a and SA2b to detect direct current I2 are provided between low-potential line Lg and the low-potential switching elements 2La and 2Lb for the legs of the H-bridge circuit 672. The current sensors SA2a and SA2b are composed of shunt resistance, for example. The current sensors SA2a and SA2b may be provided between high-potential line Lp and the high-potential switching elements 2Ha and 2Hb. The H-bridge circuit 673 is similarly provided with current sensors SA3a and SA3b to detect direct current I3. Capacitor Cd is provided between high-potential line Lp and low-potential line Lg toward power supply Bt referring to the H-bridge circuits 672 and 673. The power relay Pdr and the reverse connection protection relay PdR are connected in series on the current path between power supply Bt and capacitor Cd.

For example, MOSFETs are used for the inverter switching elements IUH/L, IVH/L, and IWH/L corresponding to the phases of the three-phase inverter circuit 68 as well as switching elements of the H-bridge circuits 672 and 673. The switching elements may use field-effect transistors or IGBTs instead of MOSFETs, for example. The current applied to the positional actuators 720 and 730 is smaller than the phase current flowing through the steering assist actuator 800. Therefore, the switching elements of the H-bridge circuits 672 and 673 may have smaller current capacities than the inverter switching elements IUH/L, IVH/L, and IWH/L. High-speed switching is unnecessary. It may be favorable to use switches such as transistors with slow on-time or mechanical relays.

Figure 8:
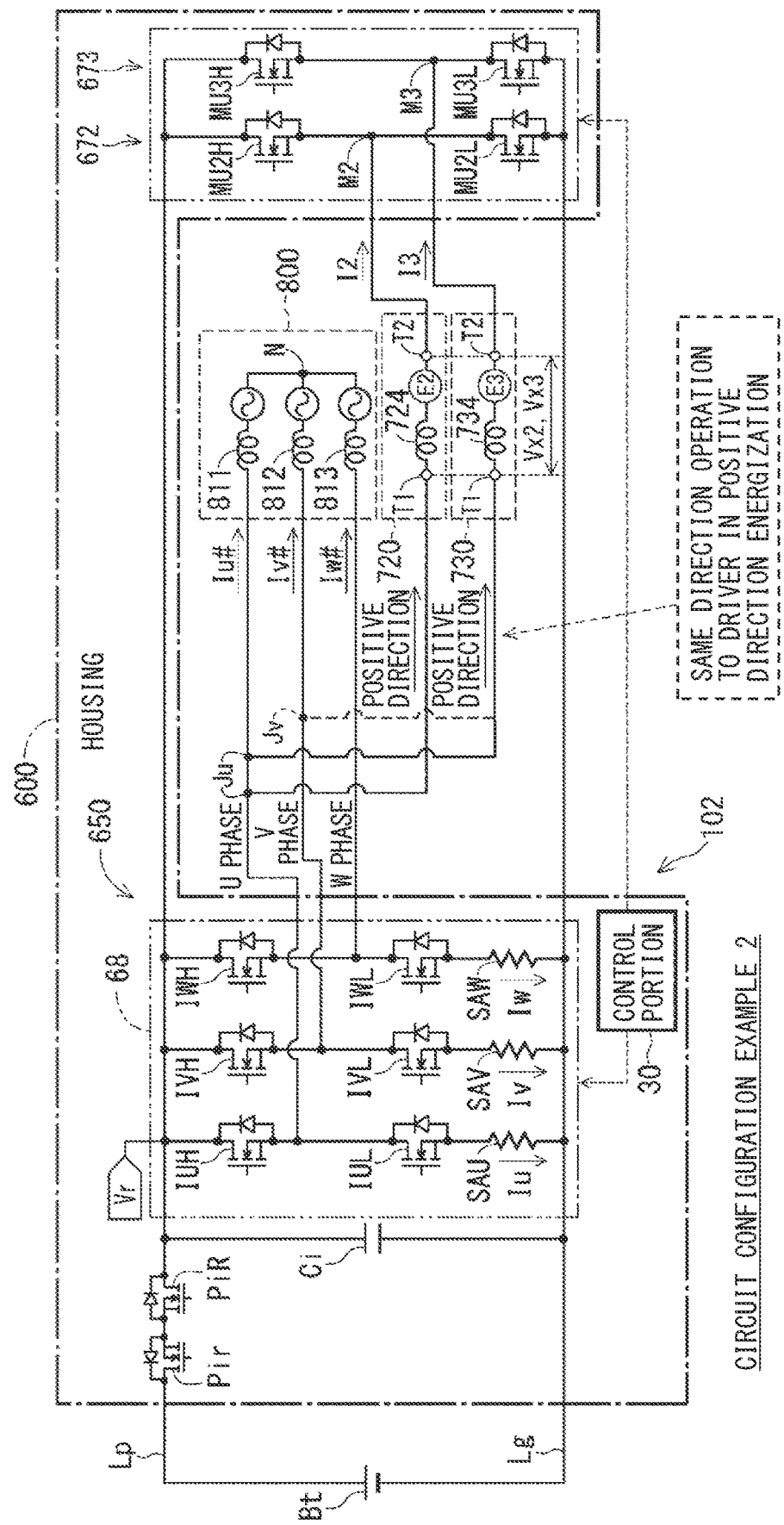
FIG. 8 is a diagram illustrating circuit configuration example 2 of the motor drive circuit according to the first embodiment.

FIG. 8 illustrates an ECU 102 according to circuit configuration example 2. One leg of the H-bridge circuits 672 and 673 is shared with the U-phase leg of the three-phase inverter circuit 68. For the convenience of illustration, the reference numerals "672" and "673" seemingly denote unshared legs, but practically denote a combined part of the U-phase legs and unshared legs of the three-phase inverter circuit 68. Circuit configuration example 2 can reduce the number of switching elements as compared with circuit configuration example 1.

As above, a power conversion circuit is configured by sharing the leg of one phase (such as the U phase) of three-phase inverter circuit 68 with one leg of the H-bridge circuits 672 and 673. This power conversion circuit is referred to as an "integrated power conversion circuit" in the present specification. According to circuit configuration example 2, one scheme of the three-phase inverter circuit 68 and the H-bridge circuits 672 and 673 forms an "integrated power conversion circuit 650." The control portion 30 integrally operates the integrated power conversion circuit 650, instead of individually operating the three-phase inverter circuit 68 and the H-bridge circuits 672 and 673.

The unshared leg of the H-bridge circuit 672 is composed of a high-potential switching element MU2H and a low-potential switching element MU2L that are connected in series via a direct-current motor terminal M2. The unshared leg of the H-bridge circuit 673 is composed of a high-potential switching element MU3H and a low-potential switching element MU3L that are connected in series via a direct-current motor terminal M3. Hereinafter, a set of switching elements composing the unshared leg is referred to as a "direct-current motor switch." Similar to the inverter switching elements, the high-potential and low-potential switches are collectively referred to as the direct-current motor switches designated by the reference symbols "MU2H/L" and "MU3H/L." The direct-current motor switches MU2H/L and MU3H/L may have smaller current capacities than the inverter switching elements IUH/L, IVH/L, and IWH/L. High-speed switching is unnecessary. It may be favorable to use switches such as transistors with slow on-time or mechanical relays.

As indicated by the solid line in the example, a first terminal T1 corresponds to one end of each of the positional actuators 720 and 730 and is connected to a branch point Ju of the U-phase current path of the three-phase winding set. A second terminal T2 corresponds to the other end of each of the positional actuators 720 and 730 opposite to the first terminal T1 and is connected to the direct-current motor terminal M2, between the direct-current motor switches MU2H/L, and the direct-current motor terminal M3, between the direct-current motor switches MU3H/L. The direct-current motor switches MU2H/L and MU3H/L are connected to the U-phase winding 811 via the positional actuators 720 and 730. As indicated by the broken line, for example, the first terminal T1 of the telescopic actuator 730 may be connected to a branch point Jv for a phase different from the branch point Ju to which the first terminal T1 of the tilt actuator 720 is connected. The "U" in the reference symbols "MU2H/L" and "MU3H/L" attached to the direct-current motor switches signifies the U phase. The numeral "2" or "3" signifies the number assigned to the direct-current motor.

Circuit configuration example 2 uses Iu #, Iv #, and Iw #to represent phase currents applied to the three-phase winding set corresponding to phase currents Iu, Iv, and Iw flowing through the three-phase inverter circuit 68. According to the example of FIG. 8, part of the phase current Iu is separated as direct-current motor current I1 at the branch point Ju of the U-phase current path. Inverter phase currents Iu, Iv, and Iw flow through the side of the branch point Ju toward the three-phase inverter circuit 68. Motor phase currents Iu #, Iv #, and Iw #are applied to the side of the branch point Ju toward the steering assist actuator 800. Equations (3.1) through (3.4) express the relationship between the inverter phase current (Iu, Iv, or Iw) and the motor phase current (Iu #, Iv #, or Iw #). A sensor or a resistor may be provided to detect current I1. When multiple direct-current motors are used, respective currents may be detected through the use of multiple resistors or a single resistor by shifting switch-on timings.

$$Iu\ \#=-Iv-Iw \quad (3.1)$$

$$Iv\ \#=Iv \quad (3.2)$$

$$Iw\ \#=Iw \quad (3.3)$$

$$I1=Iu-Iu\ \# \quad (3.4)$$

Concerning the positional actuators 720 and 730, current I1 is assumed to flow in the positive direction from the first terminal T1 to the second terminal T2. Current I1 is assumed to flow in the negative direction from the second terminal T2 to the first terminal T1. Voltages Vx2 and Vx3 are applied between the first terminal T1 and the second terminal T2 of the positional actuators 720 and 730. The positional actuators 720 and 730 normally rotate when energized in the positive direction and reversely rotate when energized in the negative direction.

Suppose a case where the steering assist actuator 800 rotates at high speed due to a large force from the outside to generate a voltage higher than power supply Bt or cause a failure. In this case, it is more favorable that the positional actuators 720 and 730, when rotated normally, operate in the same direction as the driver, in other words, approach or leave the driver. Whether approaching or leaving is favorable depends on the maximum rotation speed or displacements of the positional actuators 720 and 730.

Figure 9:
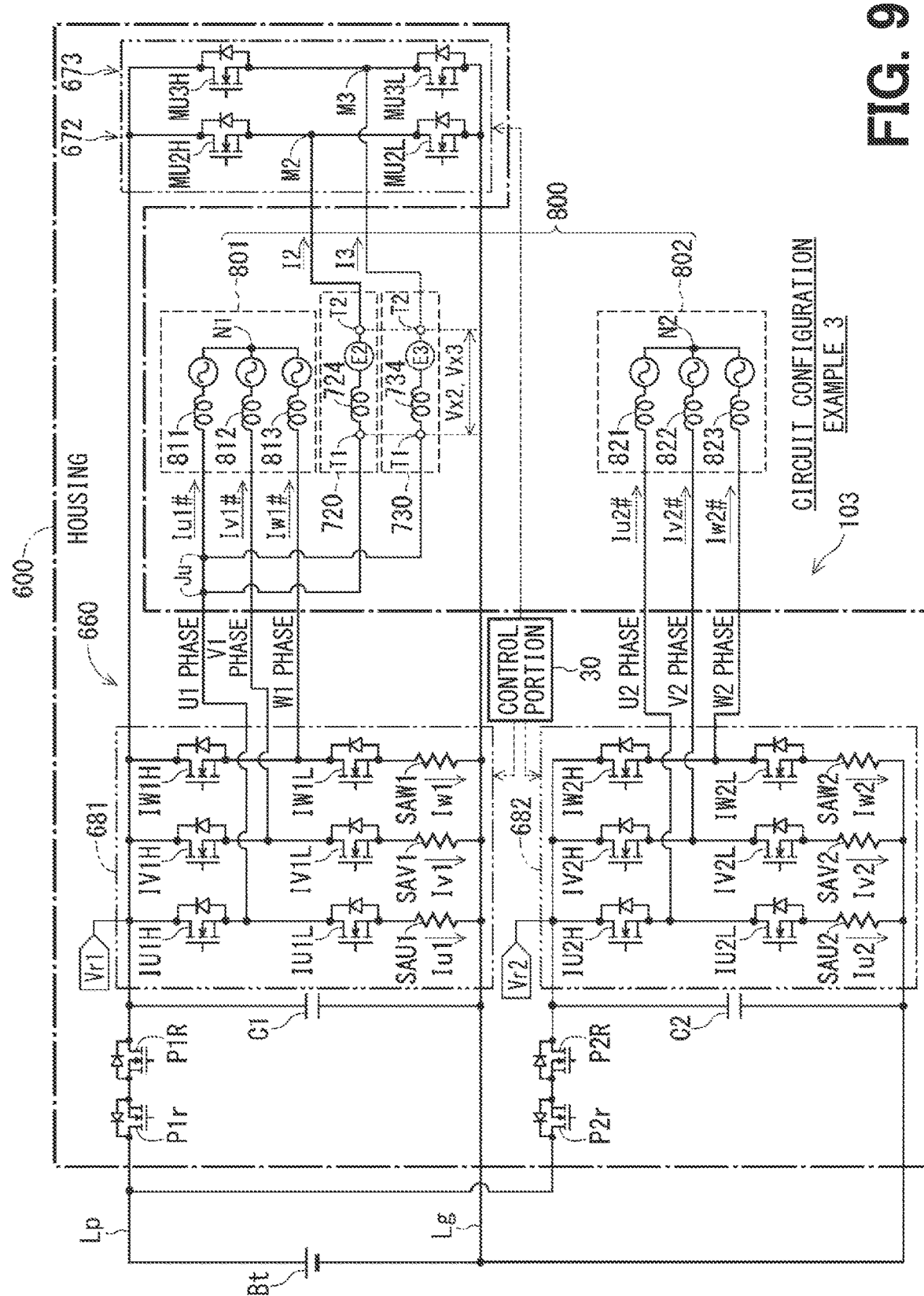
FIG. 9 is a diagram illustrating circuit configuration example 3 of the motor drive circuit according to the first embodiment.
Figure 10:
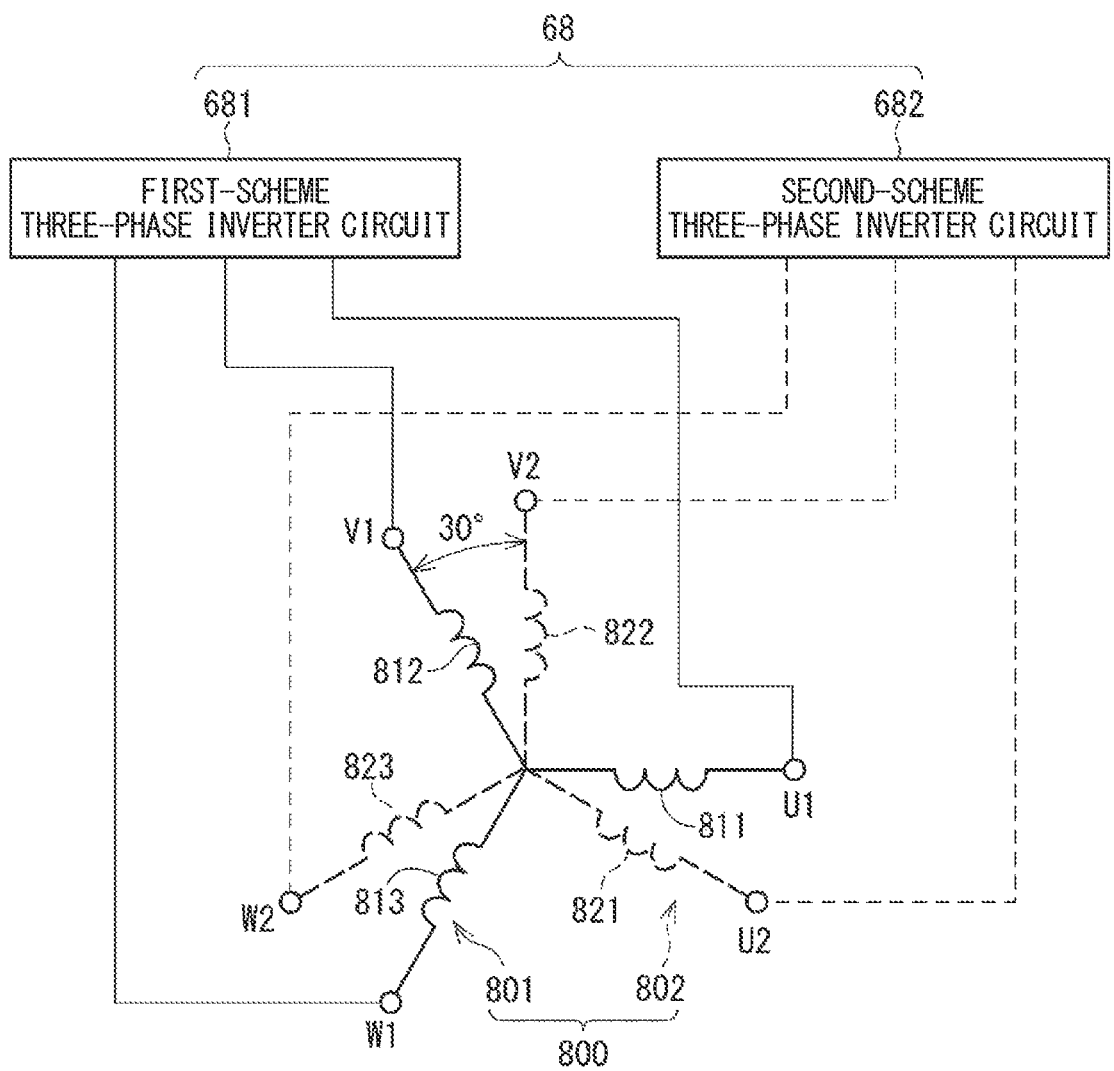
FIG. 10 is a schematic diagram illustrating the configuration of a three-phase double-winding rotary machine.

FIG. 9 illustrates an ECU 103 according to circuit configuration example 3. The "first circuit" 68 (see FIG. 10 for the reference numeral) to energize the steering assist actuator 800 is composed of the dual-scheme three-phase inverter circuits 681 and 682. The three-phase inverter circuit 681 of the first scheme is connected to the windings 811, 812, and 813 corresponding to the U1, V1, and W1 phases of the three-phase winding set 801. The three-phase inverter circuit 682 of the second scheme is connected to the windings 821, 822, and 823 corresponding to the U2, V2, and W2 phases of the three-phase winding set 802. Different microcomputers may respectively control the dual-scheme three-phase inverter circuits 681 and 682.

The three-phase inverter circuit 681 of the first scheme includes inverter switching elements IU1H/L, IV1H/L, and IW1H/L as well as current sensors SAU1, SAV1, and SAW1 to detect phase currents Iu1, Iv1, and Iw1. A capacitor C1 is provided toward the power supply Bt referring to the three-phase inverter circuit 681. A power relay P1r and a reverse connection protection relay P1R are provided between the power supply Bt and the three-phase inverter circuit 681. "Input voltage Vr1" denotes a direct-current voltage input from the power supply Bt to the three-phase inverter circuit 681. Phase currents Iu1 #, Iv1 #, and Iw1 #are applied to the three-phase winding set 801. The reference numerals and current symbols attached to the components of the second scheme are represented by substituting "2" for "1" used as the reference numerals and current symbols attached to the components of the first scheme. The description of the components of the first scheme applies to the components of the second scheme.

Similar to circuit configuration example 2, the first terminal T1 corresponds to one end of each of the positional actuators 720 and 730 and is connected to the branch point Ju on the U1-phase current path of the three-phase winding set 801 in the first scheme. The second terminal T2 corresponds to the other end of each of the positional actuators 720 and 730 opposite to the first terminal T1 and is connected to the direct-current motor terminal M2, between the direct-current motor switches MU2H/L, and the direct-current motor terminal M3, between the direct-current motor switches MU3H/L. According to the second embodiment, the lock actuator 710 may be connected to the same U1 phase of the three-phase winding set 801 in the first scheme or may be connected to a different phase. Alternatively, the lock actuator 710 may be connected to one phase of the three-phase winding set 802 in the second scheme. The direct-current motors 720, 730, and 710 may all be connected to the same phase, or all or part of the same may be connected to different phases.

One leg of each of the H-bridge circuits 672 and 673 is shared with the U1-phase leg of the three-phase inverter circuit 681 in the first scheme. According to circuit configuration example 3, the dual-scheme three-phase inverter circuits 681 and 682 and H-bridge circuits 672 and 673 form an "integrated power conversion circuit 660." The control portion 30 integrally operates the integrated power conversion circuit 660. This configuration can share and downsize legs and enables the steering assist actuator to be highly likely to continue assisting in the form of at least one scheme.

(Latch Circuit)

By reference to FIGS. 11 and 12, the description below explains configuration examples of the latch circuit for drive circuits. As will be described in a sequence by reference to FIGS. 13 and 14, the latch circuit is a self-holding circuit even when a start signal turns off after the microcomputer or ASIC of the ECU 10 starts. The start signal represents an IG (ignition) signal in engine vehicles or a signal triggered by a key to unlock the door or by opening the door. An example of the drive circuit is applied to the ECU 101 according to circuit configuration example 1. This example is also applicable to the ECUs 102 and 103 according to circuit configuration examples 2 and 3 as well as the drive circuits according to the other configurations.

Figure 11:
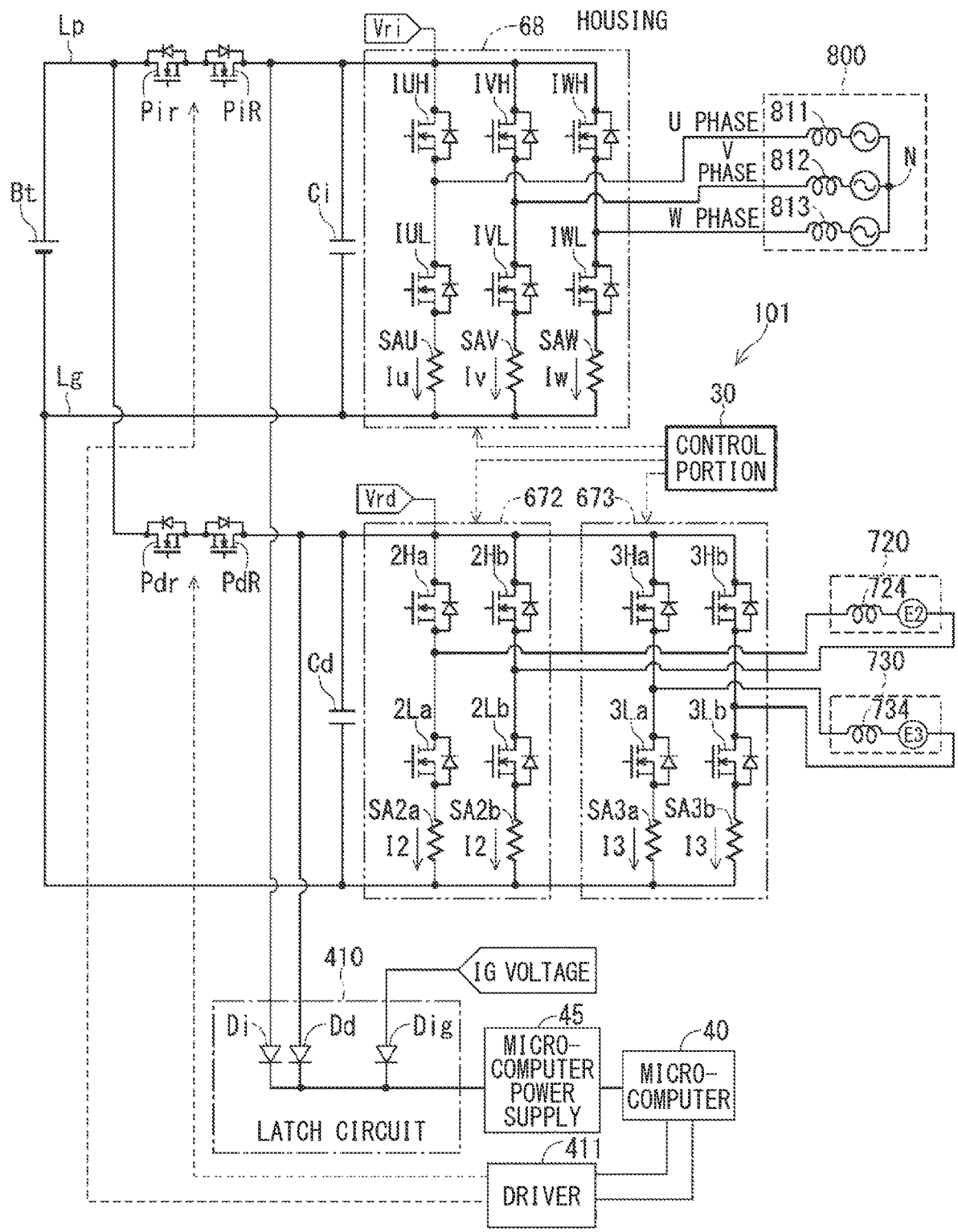
FIG. 11 is a diagram illustrating configuration example 1 of a latch circuit for drive circuits.

A latch circuit 410 according to configuration example 1 illustrated in FIG. 11 includes diodes Di, Dd, and Dig. The anodes of diodes Di and Dd are connected to the high-potential line Lp after the power relays Pir and Pdr for the three-phase inverter circuit 68 and the H-bridge circuits 672 and 673. The anode of diode Dig is connected to an IG voltage source. An IG voltage passes through the diode Dig and is applied to a microcomputer power supply 45 to activate a microcomputer 40.

Based on an instruction from the microcomputer 40, a semiconductor driver 411 turns on at least the power relay Pir of the three-phase inverter circuit 68 or the power relay Pdr of the H-bridge circuits 672 and 673. When the power relay Pir of the three-phase inverter circuit 68 turns on, relayed voltage Vri passes through the diode Di and is applied to the microcontroller power supply 45. When the power relay Pdr of the H-bridge circuits 672 and 673 turns on, relayed voltage Vrd passes through the diode Di and is applied to the microcontroller power supply 45. The voltage of the microcomputer power supply 45 is maintained even if the IG voltage input stops thereafter unless both the power relays Pir and Pdr turn off.

Figure 12:
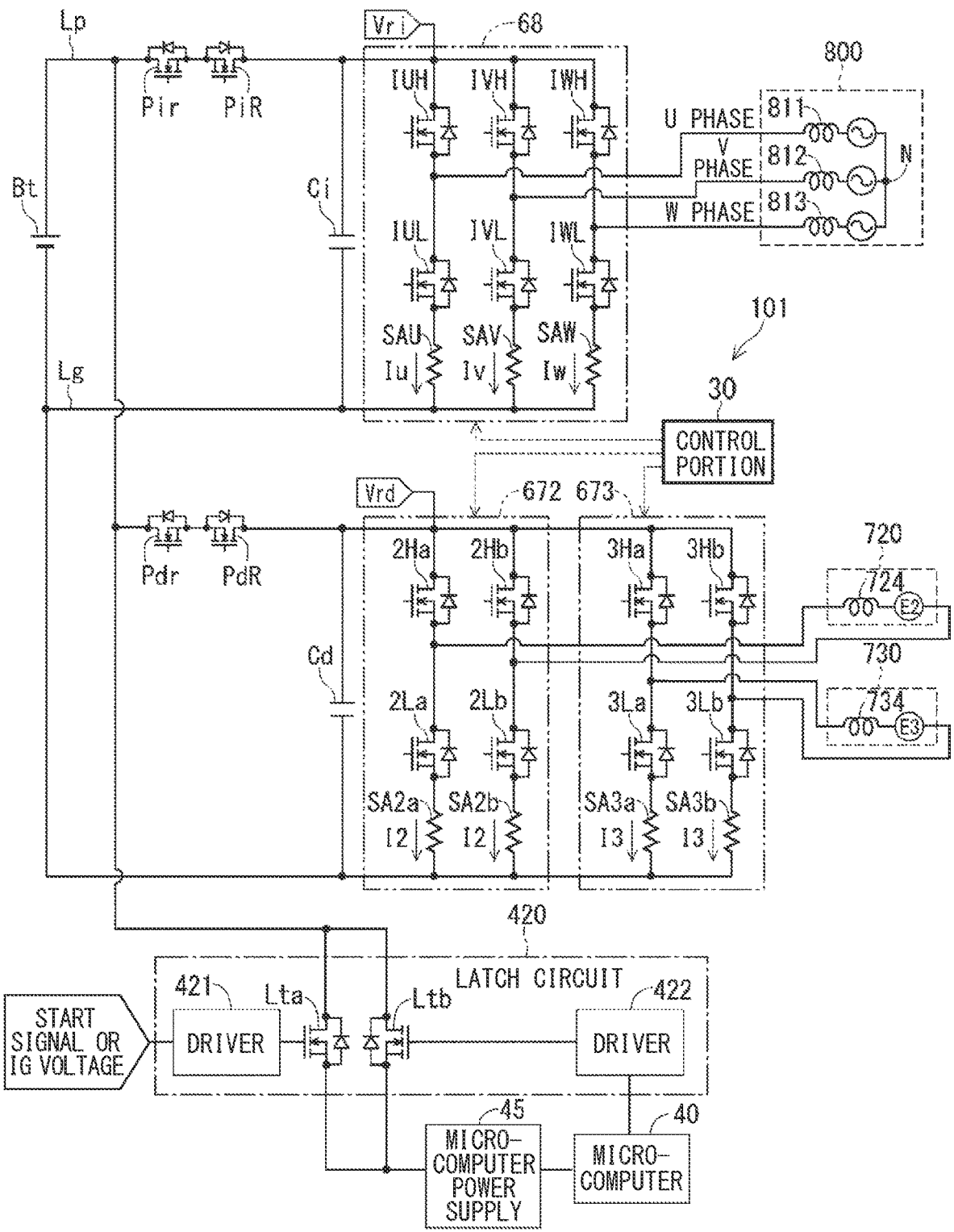
FIG. 12 is a diagram illustrating configuration example 2 of a latch circuit for drive circuits.

A latch circuit 420 according to configuration example 2 illustrated in FIG. 12 includes semiconductor drivers 421 and 422 and two switches Lta and Ltb. When the switches Lta and Ltb are MOSFETs, the drain terminal is connected to the positive electrode of the power supply Bt, and the source terminal is connected to the microcomputer power supply 45. The gate of the switch Lta is connected to the input terminal for the start signal or IG voltage via the driver 421. The gate of the switch Ltb is connected to the microcomputer 40 via the driver 422.

The start signal or IG voltage is input to the driver 421. The driver 421 outputs an on-signal to the gate of the switch Lta. The switch Lta turns on to apply the voltage of the power supply Bt to the microcomputer power supply 45. Then, the microcomputer 40 starts. Based on an instruction from the microcomputer 40, the driver 422 outputs an on-signal to the gate of the switch Ltb. Then, the switch Ltb turns on to apply the voltage of the power supply Bt to the microcomputer power supply 45. The voltage of the microcomputer power supply 45 is maintained even if the input of the start signal or IG voltage stops thereafter unless the on-signal from the driver 422 turns off.

(Sequence)

Figure 13:
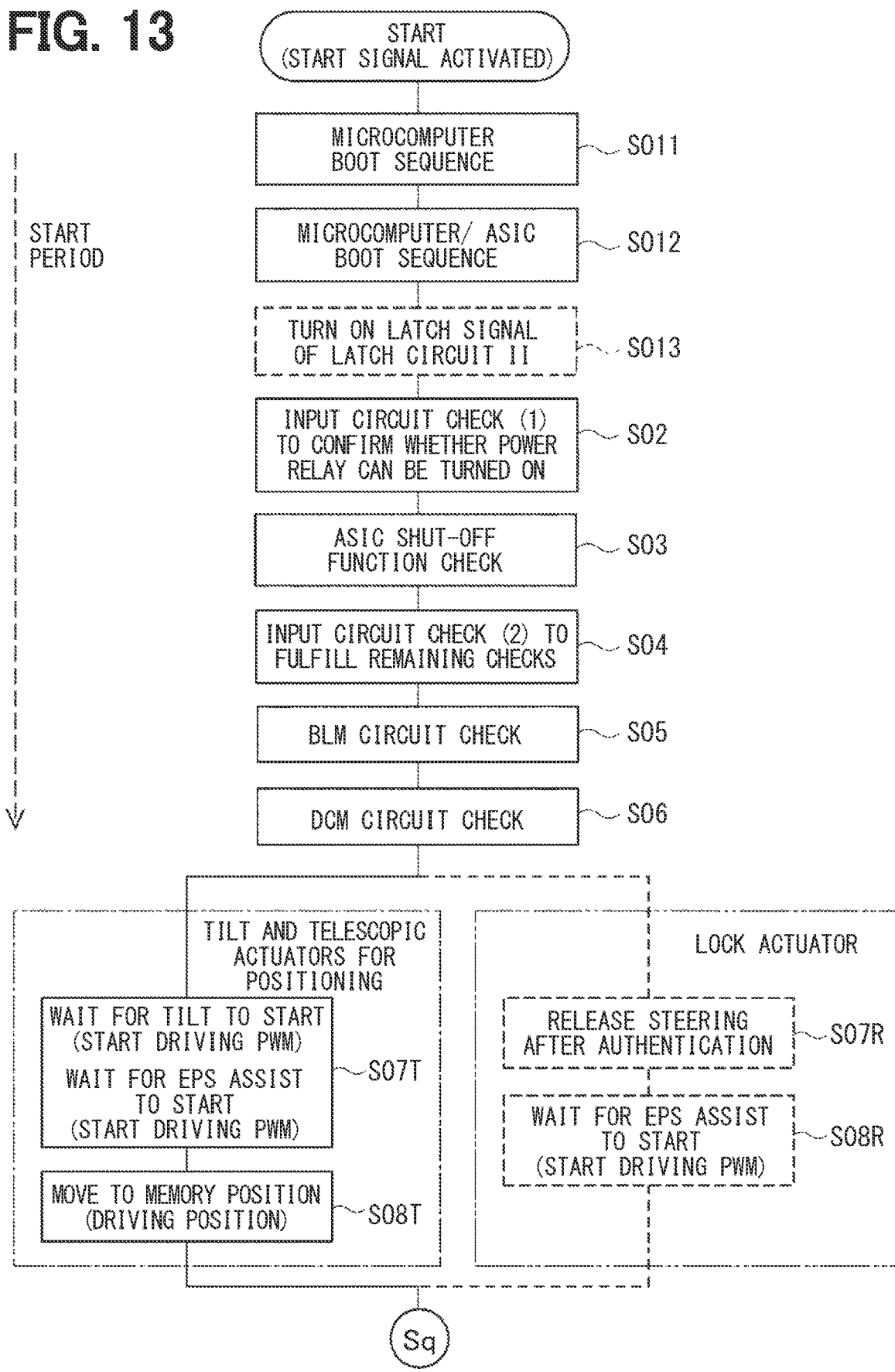
FIG. 13 is a flowchart (1) illustrating the overall sequence.

An overall sequence will be described by reference to FIGS. 13 and 14. This overall sequence is broadly divided into a start period, a normal operation period, and a stop period. The start period allows the ECU 10 to start. The normal operation period allows the ECU 10 to operate normally. The stop period allows the ECU 10 to stop.

The sequence contains different parts depending on the types of direct-current motors. The left-side solid box describes a step concerning the positional actuators 720 and 730 common to the first and second embodiments. The right-side dashed box describes a step concerning the lock actuator 710 added in the second embodiment. The latch circuits 410 and 420 according to configuration examples 1 and 2 illustrated in FIGS. 11 and 12 are denoted as "latch circuit I" and "latch circuit II," respectively. Hereinafter, the symbol "S" denotes a step. The description of the sequence omits reference symbols attached to the elements as appropriate.

The overall sequence starts when the start signal such as an IG signal or a wakeup signal turns on. At S011, a microcomputer boot sequence is performed. At S012, a microcomputer/ASIC boot sequence is performed. At S013, a latch signal of the latch circuit II turns on to start the self-holding state.

At S02, an input circuit check (1) is performed to confirm whether the power relay can be turned on. At S03, an ASIC shut-off function is checked. At S04, an input circuit check (2) is performed to fulfill the remaining checks concerning the input circuit. The power relay turns on in the middle of S04 to start the self-holding state of the latch circuit I. At S05, a BLM circuit check is performed. At S06, a DCM circuit check is performed. The "BLM (brushless motor) circuit" signifies a drive circuit for the three-phase motor, namely, the "first circuit." The "DCM (DC motor) circuit" signifies a drive circuit for the direct-current motor, namely, the "second circuit."

After each check, the control portion first moves the EPS during the start period. However, the tilt and telescopic actuators are prioritized if the steering system is positioned far from the driver. At S07T, the control portion starts the PWM drive for the EPS and tilt. The EPS waits for the assist to start and starts the assist in response to a steering torque input. The control portion starts tilting in response to an input switch operation. At S08T, the tilt and telescopic actuators move the steering wheel to a memory position, namely, a driving position. If an input switch operation occurs, the control portion stops the operation to the memory position and performs an operation corresponding to the switch operation.

At S07R of the second embodiment, the steering lock is released after authentication. At S08R, the control portion waits for the EPS assist to start while starting the PWM drive and starts the EPS assist in response to a steering torque input.

Figure 14:
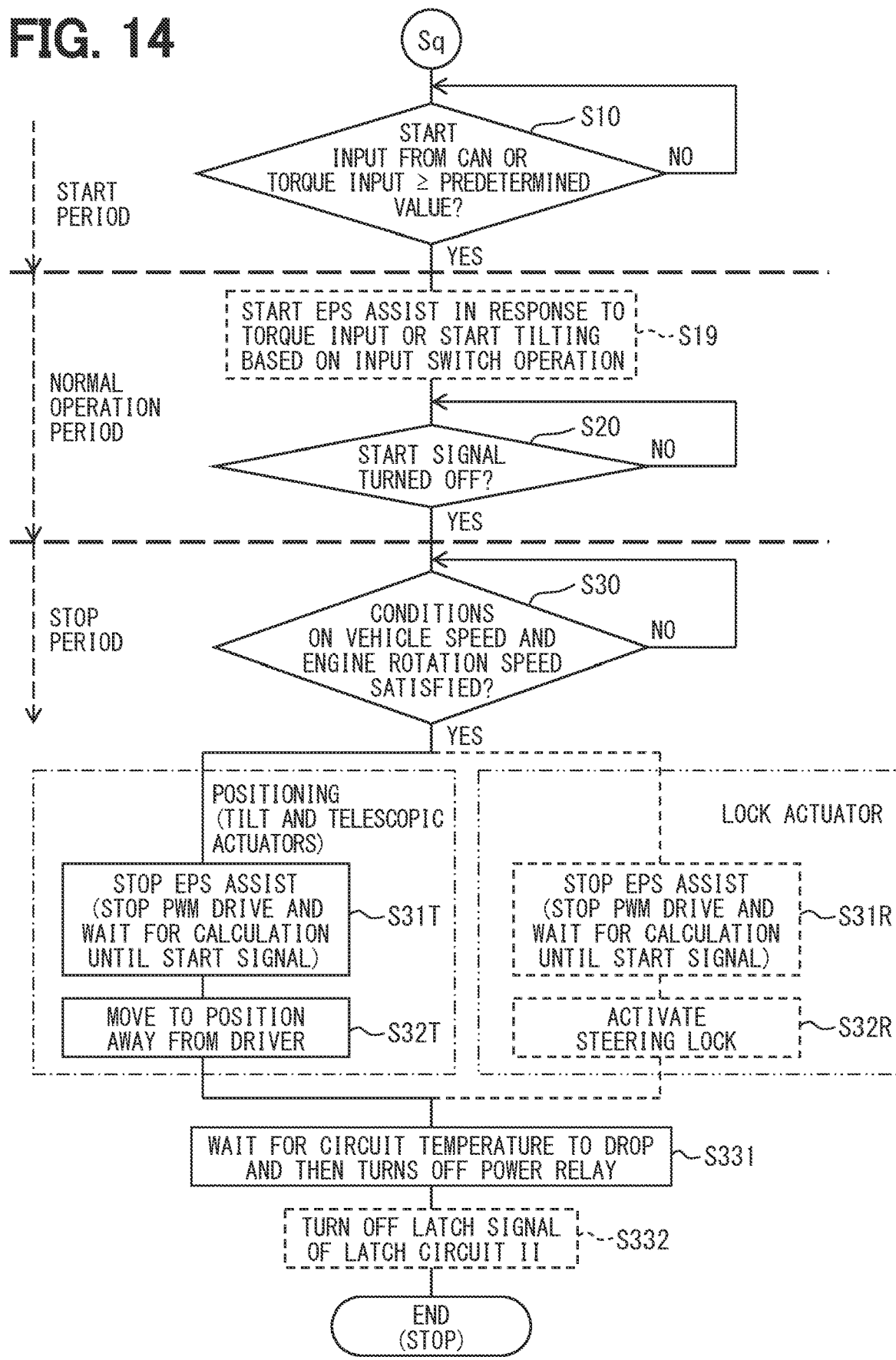
FIG. 14 is a flowchart (2) illustrating the overall sequence.

At S10 in FIG. 14, it is determined whether there is a start input from CAN or whether the torque input is greater than or equal to a specified value. If the result is YES, control proceeds to the normal operation. Control may proceed to the normal operation in response to the condition of waiting for the assist to start without awaiting the start input from CAN. At S19 during the normal operation period, the control portion starts the EPS assist in response to a steering torque input. The control portion starts tilting based on the input switch operation.

At S20, control proceeds to the stop period on the condition that the start signal turns off, the IG turns off, or a stop signal is received. At S30 of the stop period, it is determined whether the vehicle speed and the engine rotation speed satisfy the following conditions, for example. (a) The vehicle speed continues to be 0 [km/Hr]. (b) Both the engine rotation speed and the vehicle speed continue to be interrupted. (c) The vehicle speed is 0 [km/Hr] and the engine rotation speed is 0 [rpm]. If S30 is determined to be YES, control proceeds to S31T or S31R.

During the stop period, the control portion stops the steering assist actuator and then moves the tilt and telescopic actuators. At S31T, the control portion stops the EPS assist. At this time, the control portion zeroes a current directive that energizes the steering assist actuator 800. Legs other than the shared legs may stop the PWM drive and wait for calculation. The wait state continues until the start signal turns on, the IG turns on, or the ECU or the motor cools down. At S32T, the tilt and telescopic actuators move the steering wheel away from the driver.

At S31R of the second embodiment, the control portion stops the EPS assist. At this time, the control portion zeroes a current directive that energizes the steering assist actuator 800. Legs other than the shared legs may stop the PWM drive and wait for calculation. The wait state continues until the start signal turns on, the IG turns on, or the ECU or the motor cools down. At S32R, the steering lock actuator is activated. At S32R, the steering lock actuator may be activated by waiting until after the key is moved out of the vehicle or the door is unlocked or opened.

At S331, the control portion waits for the circuit temperature to drop, if necessary, and then turns off the power relay. At S332, the latch signal of the latch circuit II turns off to release the self-holding state. The ECU stops operating. Consequently, the overall sequence terminates. The state transition among the start period, the normal operation period, and the stop period may be chronological rather than based on the determination results at S10, S20, and S30.

(Drive Circuit Priorities)

The control portion 30 changes the "priorities" of the drive circuits during the start period, the normal operation period, and the stop period. This is characteristic of the embodiments that include multiple drive circuits to drive multiple actuators. According to the first embodiment, the "priority" signifies at least one of the following: an order between the operating of the first circuit and the operating of the second circuit; an allocation between an output of the first circuit and an output of the second circuit; and/or a magnitude (i.e., magnitude ratio) between the output of the first circuit and the output of the second circuit. According to the second embodiment, the control portion 30 further changes the priorities including the "third circuit." The "priority" may be used simply as the concept and may not need to be used as arithmetic parameters.

The predetermined order of operating the actuators can prevent an unintended operational interference between multiple actuators and ensure accurate operations. The maximum instantaneous output can be suppressed by operating the actuators one by one. Meanwhile, multiple actuators may be operated simultaneously. In this case, the actuators can operate efficiently based on a predetermined allocation or magnitude of outputs within the range of maximum possible output.

For example, the output allocation specifies different output ratios directed to the requested outputs from the actuators. For example, the control portion 30 operates a highly prioritized actuator to satisfy nearly 100% of the requested output. The control portion 30 operates a lowly prioritized actuator to satisfy only part of the requested output. For example, suppose a prioritized actuator corresponds to the requested output "40" and an unprioritized actuator corresponds to the requested output "90." Then, it is assumed that the prioritized actuator is mediated to directed output "40" and the unprioritized actuator is mediated to directed output "60." The prioritized side does not always increase the numeric value. Contrastingly, the output magnitude concerns the absolute output magnitudes of the drive circuits. The output allocation may use different ratios as effective values based on time-sharing, for example.

Circuit configuration examples 2 and 3 illustrated in FIGS. 8 and 9 share the leg. The whole of currents flowing through the two actuators flows through the shared leg. The sum for the two actuators determines the upper limit of voltage that can be applied to the actuators. Determining priorities is effective in downsizing the device. It is effective to define priorities in terms of thermal mass sharing within the constraints of the same housing. It is effective to define priorities in terms of noise under the condition that the same connector is used to cause adjacent signals.

Figure 15:
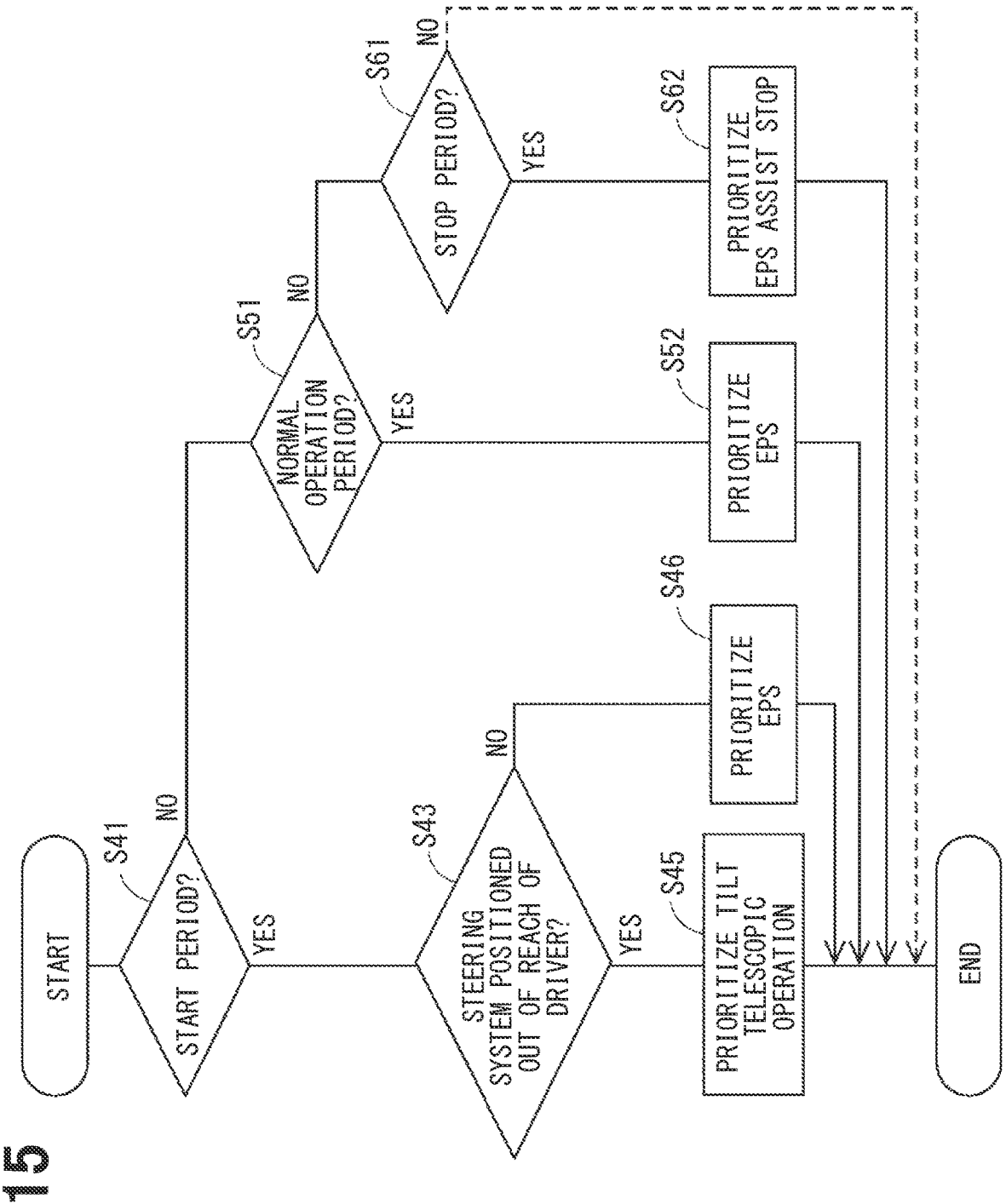
FIG. 15 is a flowchart to determine priorities of periods according to the first embodiment.

FIG. 15 illustrates a flowchart to define the priority in each period according to the first embodiment. During the start period, S41 is determined to be YES. At S43, it is determined whether the steering system is out of the reach of the driver. The driver is incapable of steering when the steering system is out of the reach of the driver. If S43 is determined to be YES, the tilt telescopic operation is prioritized at S45. S43 is determined to be NO if the steering system is within the reach of the driver. Then, EPS is prioritized at S46. The control portion 30 changes the priorities according to the steering positions during the start period.

During the normal operation period, S41 is determined to be NO and S51 is determined to be YES. The tilt telescopic operation is not performed during the normal operation, mainly while driving. Then, EPS is prioritized at S52.

During the stop period, S41 and S51 are determined to be NO, and S61 is determined to be YES. At S62, the EPS assist stop is prioritized before the tilt telescopic operation takes effect. The dashed line in the flowchart illustrates a case where none of the start period, the normal operation period, and the stop period takes effect and S61 is determined to be NO. Normally, such a case does not occur.

Figure 16:
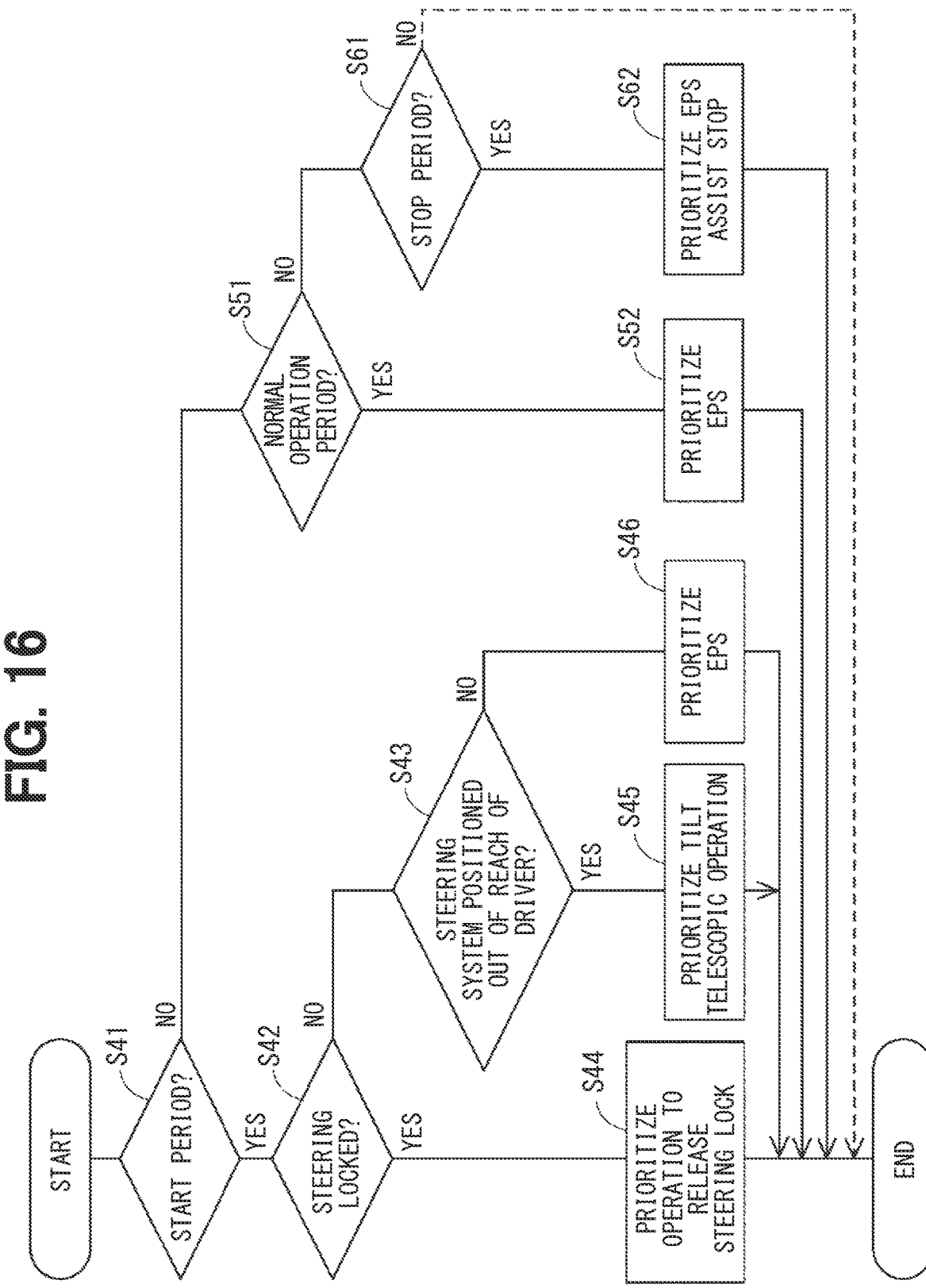
FIG. 16 is a flowchart to determine priorities of periods according to the second embodiment.

FIG. 16 illustrates a flowchart to define the priority in each period according to the second embodiment. The same steps as in FIG. 15 are assigned the same step numbers and a description is omitted for brevity. During the start period, it is determined at S42 whether the steering system is locked. The driver is incapable of steering when the steering system is locked. If S42 is determined to be YES, the operation to release the steering lock is prioritized at S44. If the steering system is not locked, S42 is determined to be NO. Control proceeds to S43. The control portion 30 changes the priorities according to the states of the lock actuator 710 during the start period.

Figure 17:
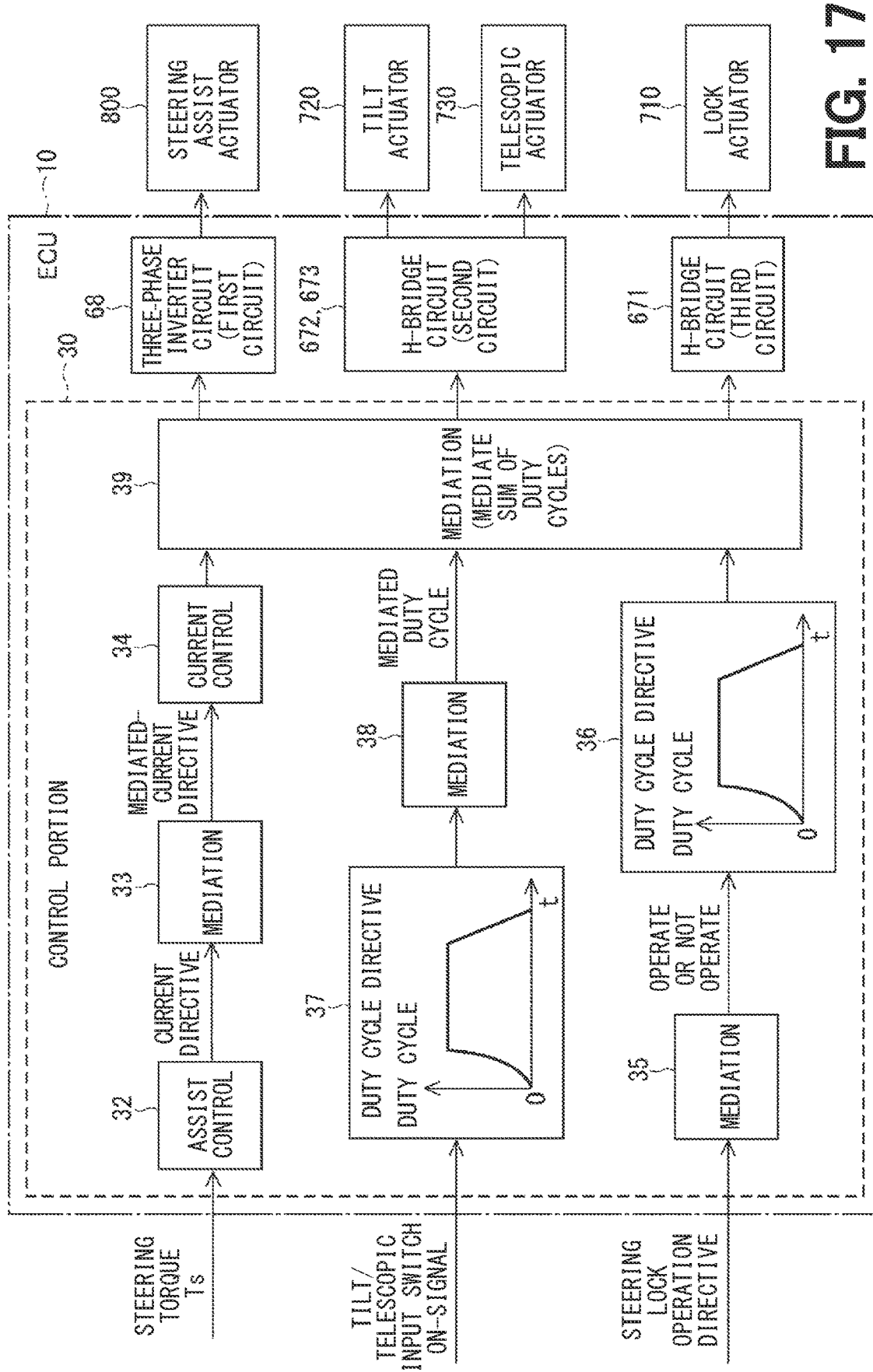
FIG. 17 is a block diagram illustrating operations according to the priorities.

FIG. 17 illustrates a block diagram of the control portion 30 according to the second embodiment. The first embodiment excludes the block to control the driving of the lock actuator 710. The control portion 30 includes mediation portions 33, 38, and 35 that mediate operations according to the priorities of the drive circuits 68, 672, 673, and 671. The control portion 30 includes a mediation portion 39 that mediates the sum of duty cycles applied to the actuators. For example, the mediation portion 39 limits the sum of duty cycles applied to the steering assist actuator 800 and the positional actuators 720 and 730, namely, the sum of applied voltages, to be smaller than a specified value according to the priorities.

The control portion 30 includes an assist control portion 32, a mediation portion 33, and a current control portion 34 as blocks to control the driving of the steering assist actuator 800. The assist control portion 32 calculates a current directive based on the input of steering torque Ts. The mediation portion 33 generates a mediated-current directive so that the current directive is unlimited when EPS is prioritized, or a current limit value limits the absolute value of the current directive when EPS is not prioritized. The current control portion 34 calculates a drive signal under current feedback control based on the mediated-current directive, for example, and outputs the drive signal to the three-phase inverter circuit 68 as the "first circuit."

The control portion 30 includes a duty cycle directive portion 37 and a mediation portion 38 as blocks to control the driving of the positional actuators 720 and 730. The duty cycle directive portion 37 settles a time profile of the duty cycle directive in response to input of an input switch on-signal. The duty cycle may increase immediately. More preferably, the duty cycle is configured to increase from 0 to a predetermined value, remain unchanged for a predetermined duration, and then return to 0. The duty cycle may be configured to decrease from 100 to a predetermined value depending on the normal/reverse rotation direction of the actuator, remain unchanged for a predetermined duration, and then return to 100.

The mediation portion 38 does not limit operations when the tilt telescopic is prioritized. The mediation portion 38 limits the duty cycle when EPS or the steering lock is prioritized. When EPS is prioritized, for example, the mediation portion 38 may limit the duty cycle according to the EPS output. The drive signal based on the mediated duty cycle is output to the H-bridge circuits 672 and 673 as the "second circuit." As above, the description of the duty cycle concerns the voltage applied between actuator lines. The duty cycle of each leg depends on the voltage to be applied. The H-bridge circuits 672 and 673 and three-phase inverter circuit 68 may share some legs. Only the shared legs may be used to increase or decrease the duty cycle.

The control portion 30 includes a mediation portion 35 and a duty cycle directive portion 36 as blocks to control the driving of the lock actuator 710. The mediation portion 35 is supplied with a steering lock operation directive. The mediation portion 35 mediates to operate the lock actuator 710 when the steering lock is prioritized. The mediation portion 35 mediates not to operate the lock actuator 710 when the steering lock is not prioritized.

To operate the lock actuator 710, the duty cycle directive portion 36 settles a time profile for the duty cycle directive. The duty cycle may increase immediately. More preferably, the duty cycle is configured to increase from 0 to a predetermined value, remain unchanged for a predetermined duration, and then return to 0. The duty cycle may be configured to decrease from 100 to a predetermined value depending on the normal/reverse rotation direction of the actuator, remain unchanged for a predetermined duration, and then return to 100. The drive signal based on the duty cycle is output to the H-bridge circuit 671 as the "third circuit." As above, the description of the duty cycle concerns the voltage applied between actuator lines. The duty cycle of each leg depends on the voltage to be applied. The H-bridge circuit 671 and three-phase inverter circuit 68 may share some legs. Only the shared legs may be used to increase or decrease the duty cycle.

As above, the example operations according to the priorities include limiting the current directive on the steering assist actuator 800, changing duty cycles for the positional actuators 720 and 730, and determining whether to operate the lock actuator 710. However, the method of limitation may be changed. For example, the mediation portion 39 may limit only duty cycles for the three types of actuators while the mediation portion 39 mediates the sum of duty cycles for the actuators. In this case, it is easy to limit the total voltage applied to the steering assist actuator 800 and the direct-current motors 710, 720, and 730 in a configuration where the H-bridge circuits 671, 672, and 673 and the three-phase inverter circuit 68 share some legs. When the current directive is limited, the steering assist actuator 800 according to the example can easily ensure the minimum output torque in terms of the steering assist actuator 800. When a prioritized object is operating, the process may be simplified by inactivating the other objects.

(Effects)

(1) The ECU 10 according to the first embodiment uses the same housing 600 to contain the circuits 68, 672, and 673 that drive multiple actuators 800, 720, and 730. The control portion 30 efficiently drives the actuators 800, 720, and 730 by operating the "first circuit" 68 and the "second circuits" 672 and 673 according to the priorities such as the order of operations, the allocation of output, and the magnitude of output. It is possible to avoid the concentration of heat and power and suppress the thermal mass or radiation amount of the circuits. The housing 600 can be downsized.

(2) The control portion 30 changes the priorities during the start period according to the steering position. Specifically, priority is given to the tilt telescopic operation to move steering positions when the steering system is out of the driver's reach during the start period. The steering system moves to the memory position, enabling the driver to do the steering.

Figure 7:
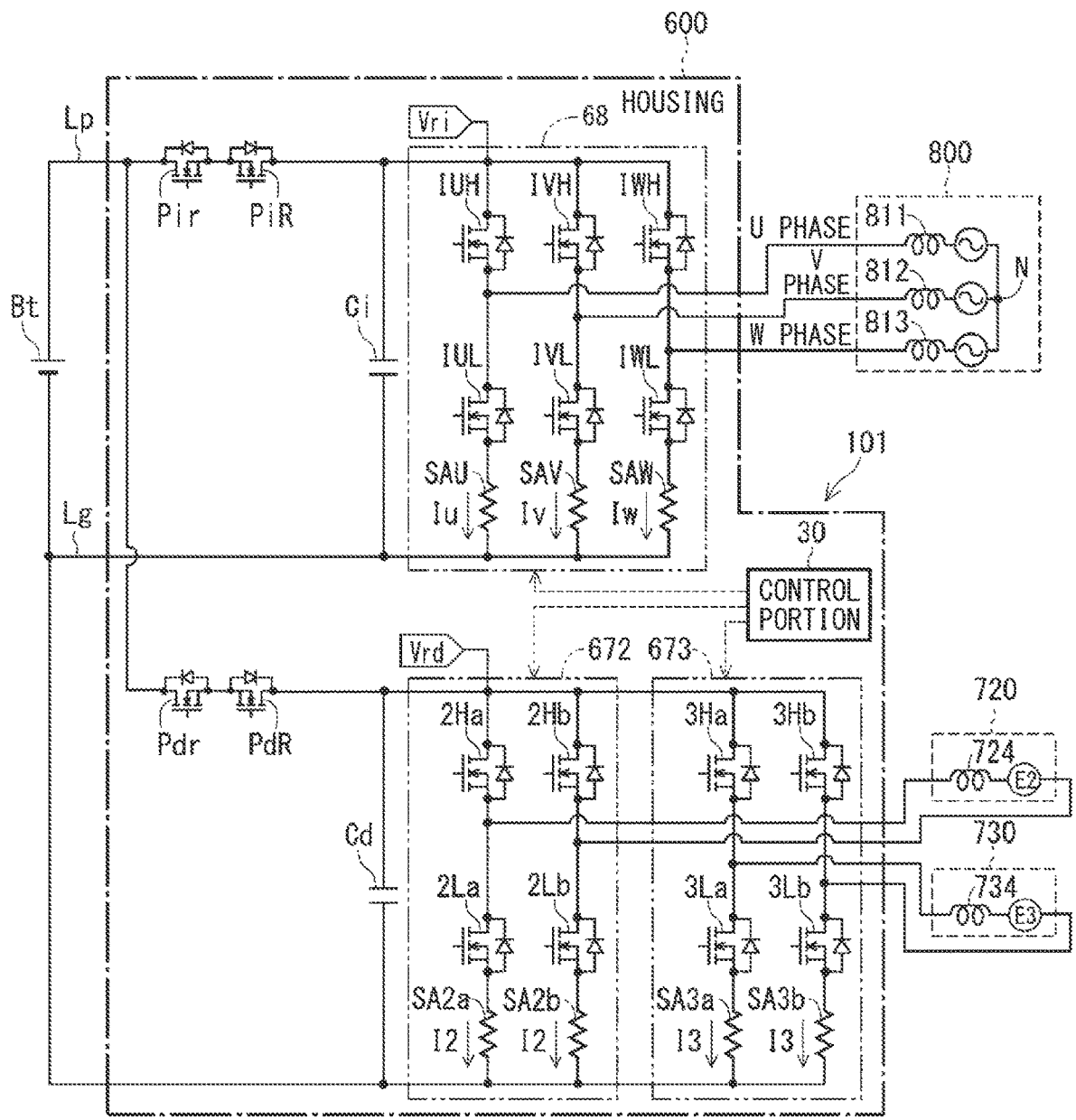
FIG. 7 is a diagram illustrating circuit configuration example 1 of a motor drive circuit according to the first embodiment.

(3) According to circuit configuration example 1 illustrated in FIG. 7, the three-phase inverter circuit 68 and the H-bridge circuits 672 and 673 are provided independently and parallel. If one drive circuit fails, it is easy to prevent the failure from spreading to the other drive circuit.

(4) According to circuit configuration examples 2 and 3 illustrated in FIGS. 8 and 9, the three-phase inverter circuit 68 and the H-bridge circuits 672 and 673 form the integrated power conversion circuits 650 and 660. The control portion 30 integrally operates the integrated power conversion circuits 650 and 660. The integrated power conversion circuits 650 and 660 can reduce the number of switching elements and downsize the housing 600.

(5) According to circuit configuration example 3 illustrated in FIG. 9, the three-phase motor configuring the steering assist actuator 800 is a double-winding rotary machine including two three-phase winding sets 801 and 802. The "first circuit" 68 is composed of two three-phase inverter circuits 681 and 682. The redundant configuration of the steering assist actuator 800 improves the reliability.

(6) According to circuit configuration examples 2 and 3, the control portion 30 limits the total voltage, applied to the steering assist actuator 800 and the positional actuators 720 and 730, to be smaller than a specified value according to the priority. The maximum voltage is successfully used to effectively downsize the device.

Other Embodiments (a) The steering assist actuator 800, configured as a multiphase rotary machine, may use not only a three-phase motor but also a motor having four or more phases. The steering assist actuator 800 is not limited to a multiphase motor such as a three-phase motor but may be composed of a direct-current motor or an actuator other than motors.

(b) The positional actuators 720 and 730 and the lock actuator 710 are not limited to direct-current motors but may be configured as actuators such as linear cylinders other than motors.

(c) The positional actuators 720 and 730 are not limited to two actuators such as the tilt actuator 720 and the telescopic actuator 730 but may use one or more actuators (such as direct-current motors) to move steering positions. Meanwhile, the number of the second circuits (such as H-bridge circuits) is not limited to two but may be one or more. When there is one "direct-current rotary machine" or "H-bridge circuit," "each" in the expressions such as "each direct-current rotary machine" or "each H-bridge circuit" does not presuppose the plurality but is interpreted as the prefix denoting "the corresponding one."

(d) A three-phase motor relay or a direct-current motor relay may be added to circuit configuration examples illustrated in FIGS. 7 through 9. An LC filter circuit may be added to the input portion. They may be added to or shared with each of the first circuit, the second circuit, and the third circuit. The first circuit and the second circuit may be connected to individual power supplies instead of being connected to the common power supply Bt.

It is to be distinctly understood that the present disclosure is not limited to the above-mentioned embodiments but may be otherwise variously embodied within the spirit and scope of the disclosure.

The control portion and the technique thereof described in the present disclosure may be embodied by a dedicated computer that is provided by configuring memory and a processor programmed to perform one or more functions embodied by a computer program. Alternatively, the control portion and the technique thereof described in the disclosure may be embodied by a dedicated computer that is provided by configuring a processor through the use of one or more dedicated hardware logic circuits. Alternatively, the control portion and the technique thereof described in the disclosure may be embodied by one or more dedicated computers each configured by a combination of memory, a processor programmed to perform one or more functions, and a processor composed of one or more hardware logic circuits. The computer program may be provided as instructions executed by the computer and may be stored in a computer-readable non-transitional tangible recording medium.

The present disclosure has been described based on the embodiments. However, the disclosure is not limited to the embodiments and the structures. The disclosure includes various modifications and modifications within a comparable scope. Besides, the category or the scope of the idea of the disclosure covers various combinations or forms and the other combinations or forms including only one element or more or less in the former.

What is claimed is:

1. A steering control device comprising:
a first circuit configured to energize a steering assist actuator that is configured to electrically assist steering of a driver;
at least one second circuit provided in a same housing as the first circuit and configured to energize at least one positional actuator to move a steering position; and
a controller configured to operate the first circuit and the second circuit to control operations of the steering assist actuator and the positional actuator, wherein the controller is configured to change a priority between the first circuit and the second circuit in
a start period, in which the steering control device is started,
a normal operation period, in which the steering control device is operated normally, and
a stop period, in which the steering control device is stopped, and
the priority includes at least one of
an order between operating of the first circuit and operating of the second circuit,
an allocation between an output of the first circuit and an output of the second circuit, and
a magnitude between the output of the first circuit and the output of the second circuit.

2. The steering control device according to claim 1, wherein
the steering assist actuator is a multiphase rotary machine including at least one multiphase winding set,
the positional actuator is a direct-current rotary machine,
the first circuit includes at least one multiphase inverter circuit that is configured to convert direct-current power and energize the steering assist actuator,
the second circuit includes an H-bridge circuit that is configured to convert direct-current power and energize the positional actuator,
the at least one multiphase inverter circuit and the H-bridge circuit include a leg that includes a set of a high-potential switching element and a low-potential switching element, which are serially connected,
the direct-current rotary machine includes a first terminal at one end and a second terminal at an other end,
the first terminal is connected to a phase current path corresponding to one phase of the at least one multiphase winding set,
the second terminal is connected to a switch of the leg in the H-bridge circuit for the direct-current rotary machine, and
the at least one multiphase inverter circuit and the H-bridge circuit form an integrated power conversion circuit that shares the leg, the leg corresponding to one phase of the at least one multiphase inverter circuit and a leg of a plurality of legs of the H-bridge circuit.

3. The steering control device according to claim 1, wherein
the steering assist actuator is a multiphase rotary machine including at least one multiphase winding set,
the positional actuator is at least one direct-current rotary machine,
the first circuit includes at least one multiphase inverter circuit that is configured to convert direct-current power and energize the steering assist actuator,
the second circuit includes an H-bridge circuit that is configured to convert direct-current power and energize the positional actuator, and
the at least one multiphase inverter circuit and the H-bridge circuit are independently provided in parallel.

4. The steering control device according to claim 2, wherein
the multiphase rotary machine is a double-winding rotary machine including two multiphase winding sets,
the first circuit includes two multiphase inverter circuits configured to energize the two multiphase winding sets, and
the direct-current rotary machine is connected to a phase current path of one of the two multiphase winding sets.

5. The steering control device according to claim 2, wherein
- the controller is configured to limit a total voltage, which is applied to the steering assist actuator and the positional actuator, to be smaller than a predetermined value according to the priority.

6. The steering control device according to claim 2, wherein
- the at least one positional actuator includes a plurality of positional actuators, and
- when a current flows from the first terminal to the second terminal, the positional actuators operate in a same direction relative to the driver.

7. The steering control device according to claim 1, further comprising:
- a third circuit to energize a lock actuator that is configured to drive a locking device that is configured mechanically regulate steering rotation.

8. The steering control device according to claim 1, wherein
- the controller is configured to change the priority according to the steering position in the start period.

* * * * *